(12) United States Patent
Mitchell et al.

(10) Patent No.: US 11,465,557 B2
(45) Date of Patent: Oct. 11, 2022

(54) VEHICLE LATCH WITH INTEGRATED RADAR MODULE

(71) Applicant: MAGNA CLOSURES INC., Newmarket (CA)

(72) Inventors: J. R. Scott Mitchell, Newmarket (CA); Stephen James Caron, Aurora (CA); Traian Miu, Oakville (CA); James J. Ferri, Maple (CA); Gabriele Wayne Sabatini, Keswick (CA)

(73) Assignee: MAGNA CLOSURES INC., Newmarket (CA)

( * ) Notice: Subject to any disclaimer, the term of this patent is extended or adjusted under 35 U.S.C. 154(b) by 755 days.

(21) Appl. No.: 16/373,692

(22) Filed: Apr. 3, 2019

(65) Prior Publication Data
US 2019/0309564 A1    Oct. 10, 2019

Related U.S. Application Data

(60) Provisional application No. 62/653,822, filed on Apr. 6, 2018, provisional application No. 62/725,480, filed on Aug. 31, 2018.

(51) Int. Cl.
*B60Q 5/00* (2006.01)
*B60Q 1/50* (2006.01)
(Continued)

(52) U.S. Cl.
CPC ............... *B60Q 5/006* (2013.01); *B60J 5/04* (2013.01); *B60J 5/101* (2013.01); *B60Q 1/323* (2013.01);
(Continued)

(58) Field of Classification Search
CPC .......... B60Q 5/005; B60Q 1/323; B60Q 1/50; E05B 85/16; E05B 85/90
See application file for complete search history.

(56) References Cited

U.S. PATENT DOCUMENTS 6,363,619 B1 *   4/2002   Schirmer ............. G01M 11/067
                                                               33/600
9,174,517 B2    11/2015   Scheuring et al.
(Continued)

FOREIGN PATENT DOCUMENTS

CN      101357622 A      2/2009
CN      101372200 A      2/2009
(Continued)

*Primary Examiner* — Hoi C Lau
(74) *Attorney, Agent, or Firm* — Dickinson Wright PLLC

(57) ABSTRACT

An electronic latch system for a motor vehicle includes an electronic latch (e-latch) including an e-latch controller within a door of the vehicle. A plurality of radar sensors are located within the door for performing non-contact detection of objects around the vehicle. The radar sensors include an outside-face sensor adjacent an outside face of the door to sense an object within a first sensing zone extending from the outside face. The radar sensors also include an inner sensor adjacent an inside surface of the door to sense an object within a second sensing zone extending from the inside surface. The radar sensors also include a shut-face sensor adjacent a shut face of the door to sense an object within a third sensing zone extending from the shut face. The e-latch includes a light source for projecting a warning image and an audio source for generating an audible warning.

13 Claims, 21 Drawing Sheets

(51) Int. Cl.
*B60Q 9/00* (2006.01)
*B60Q 1/32* (2006.01)
*B60J 5/04* (2006.01)
*B60J 5/10* (2006.01)

(52) U.S. Cl.
CPC .............. *B60Q 1/50* (2013.01); *B60Q 1/525* (2013.01); *B60Q 5/005* (2013.01); *B60Q 9/008* (2013.01); *B60Q 2400/50* (2013.01)

(56) References Cited

U.S. PATENT DOCUMENTS

| | | | |
|---|---|---|---|
| 9,353,556 B2 | 5/2016 | Margheritti et al. | |
| 10,378,254 B1* | 8/2019 | Salter | E05B 81/76 |
| 10,407,946 B2* | 9/2019 | Capalau | E05B 81/64 |
| 10,435,924 B1* | 10/2019 | Salter | E05B 81/78 |
| 10,443,292 B2* | 10/2019 | Baruco | E05F 15/73 |
| 10,633,895 B1* | 4/2020 | Salter | G07C 9/23 |
| 10,704,315 B2* | 7/2020 | Hamminga | E05D 7/00 |
| 10,913,393 B2* | 2/2021 | Tsang | B60Q 9/00 |
| 11,136,000 B2* | 10/2021 | Cumbo | B60R 25/2045 |
| 2007/0152869 A1* | 7/2007 | Woodington | G01S 13/48 |
| | | | 342/72 |
| 2010/0007463 A1* | 1/2010 | Dingman | E05B 81/78 |
| | | | 340/425.5 |
| 2010/0213846 A1* | 8/2010 | Thomas | B60Q 1/1423 |
| | | | 362/464 |
| 2013/0104459 A1* | 5/2013 | Patel | E05B 85/12 |
| | | | 292/201 |
| 2014/0000165 A1* | 1/2014 | Patel | E05B 81/77 |
| | | | 292/201 |
| 2014/0000167 A1* | 1/2014 | Patel | E05B 81/34 |
| | | | 49/32 |
| 2014/0069015 A1* | 3/2014 | Salter | E05B 81/00 |
| | | | 49/31 |
| 2014/0203924 A1 | 7/2014 | Shin et al. | |
| 2016/0264096 A1* | 9/2016 | Barber | B60R 22/48 |
| 2017/0097413 A1* | 4/2017 | Gillian | G01S 13/56 |
| 2017/0306684 A1* | 10/2017 | Baruco | E05F 15/622 |
| 2018/0073286 A1* | 3/2018 | Cuddihy | B62D 25/12 |
| 2018/0163439 A1 | 6/2018 | Patane et al. | |
| 2018/0170309 A1* | 6/2018 | McMahon | B60Q 1/50 |
| 2018/0179788 A1* | 6/2018 | Oxley | E05B 81/13 |
| 2018/0238099 A1 | 8/2018 | Schatz et al. | |
| 2018/0347252 A1* | 12/2018 | Zeabari | B60J 5/102 |
| 2019/0024421 A1* | 1/2019 | Cumbo | G07C 9/00174 |
| 2019/0078359 A1* | 3/2019 | Zhang | B60Q 9/008 |
| 2019/0128040 A1* | 5/2019 | Mitchell | E05F 15/40 |
| 2019/0152433 A1* | 5/2019 | Cumbo | G07C 9/00714 |
| 2019/0153768 A1* | 5/2019 | Termine | E05F 15/622 |
| 2019/0263233 A1* | 8/2019 | Sardelli | B60J 5/0463 |
| 2019/0264474 A1* | 8/2019 | Ottino | E05B 81/36 |
| 2019/0271180 A1* | 9/2019 | Sardelli | E05B 81/36 |
| 2019/0292818 A1* | 9/2019 | Cumbo | E05B 81/38 |
| 2019/0309564 A1* | 10/2019 | Mitchell | E05B 83/36 |
| 2019/0352954 A1* | 11/2019 | Salter | E05B 81/76 |
| 2019/0390488 A1* | 12/2019 | Salter | E05B 85/103 |
| 2020/0157873 A1* | 5/2020 | Sabatini | B60Q 1/323 |
| 2020/0256951 A1* | 8/2020 | Kunkel | G01S 17/931 |
| 2020/0270928 A1* | 8/2020 | Cumbo | E05F 15/41 |
| 2020/0284068 A1* | 9/2020 | Cumbo | E05B 79/20 |
| 2020/0298790 A1* | 9/2020 | Caron | B60Q 9/008 |
| 2020/0318400 A1* | 10/2020 | Johann | E05B 81/20 |
| 2020/0408025 A1* | 12/2020 | Zeabari | E05F 15/622 |
| 2021/0087868 A1* | 3/2021 | Washeleski | E05F 15/44 |
| 2021/0262274 A1* | 8/2021 | Schatz | E05F 15/73 |
| 2021/0301561 A1* | 9/2021 | Cumbo | E05F 15/622 |
| 2021/0301562 A1* | 9/2021 | Cumbo | E05B 79/08 |
| 2021/0354630 A1* | 11/2021 | Distefano | B62D 25/12 |
| 2021/0355716 A1* | 11/2021 | Cumbo | E05B 81/34 |
| 2021/0370864 A1* | 12/2021 | Distefano | B60R 21/0134 |
| 2021/0372169 A1* | 12/2021 | Patane | E05B 81/36 |

FOREIGN PATENT DOCUMENTS

| | | |
|---|---|---|
| CN | 104085348 A | 10/2014 |
| CN | 106401350 A | 2/2017 |
| CN | 106939748 A | 7/2017 |
| CN | 107109887 A | 8/2017 |
| DE | 10056569 A1 | 5/2002 |
| JP | 2014122542 A | 7/2014 |
| KR | 20150055282 A | 5/2015 |

* cited by examiner

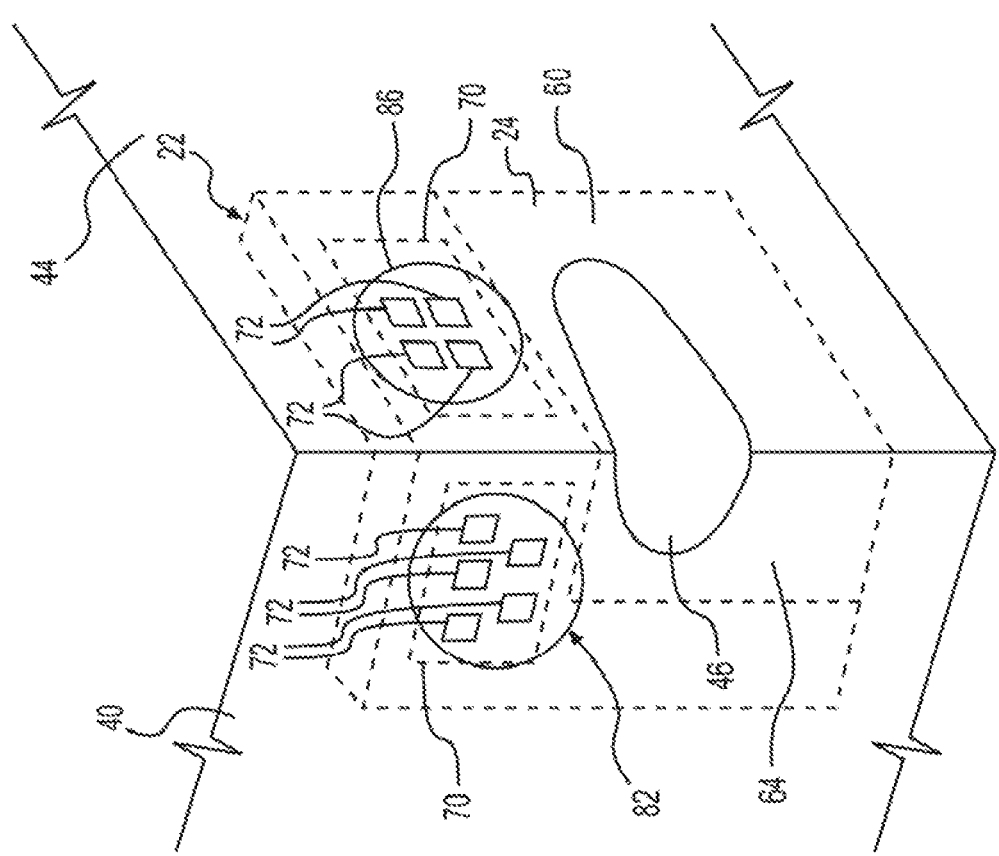

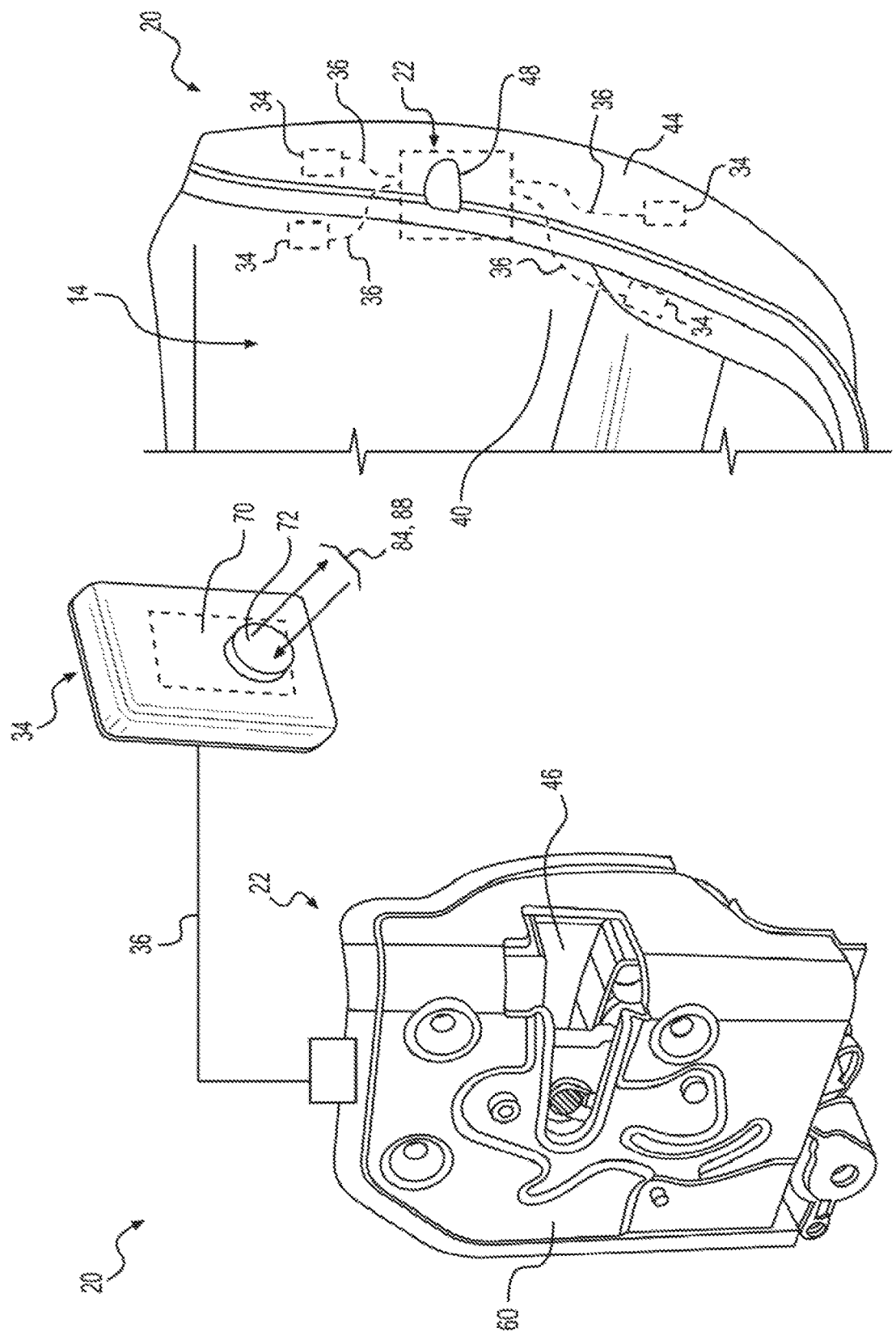

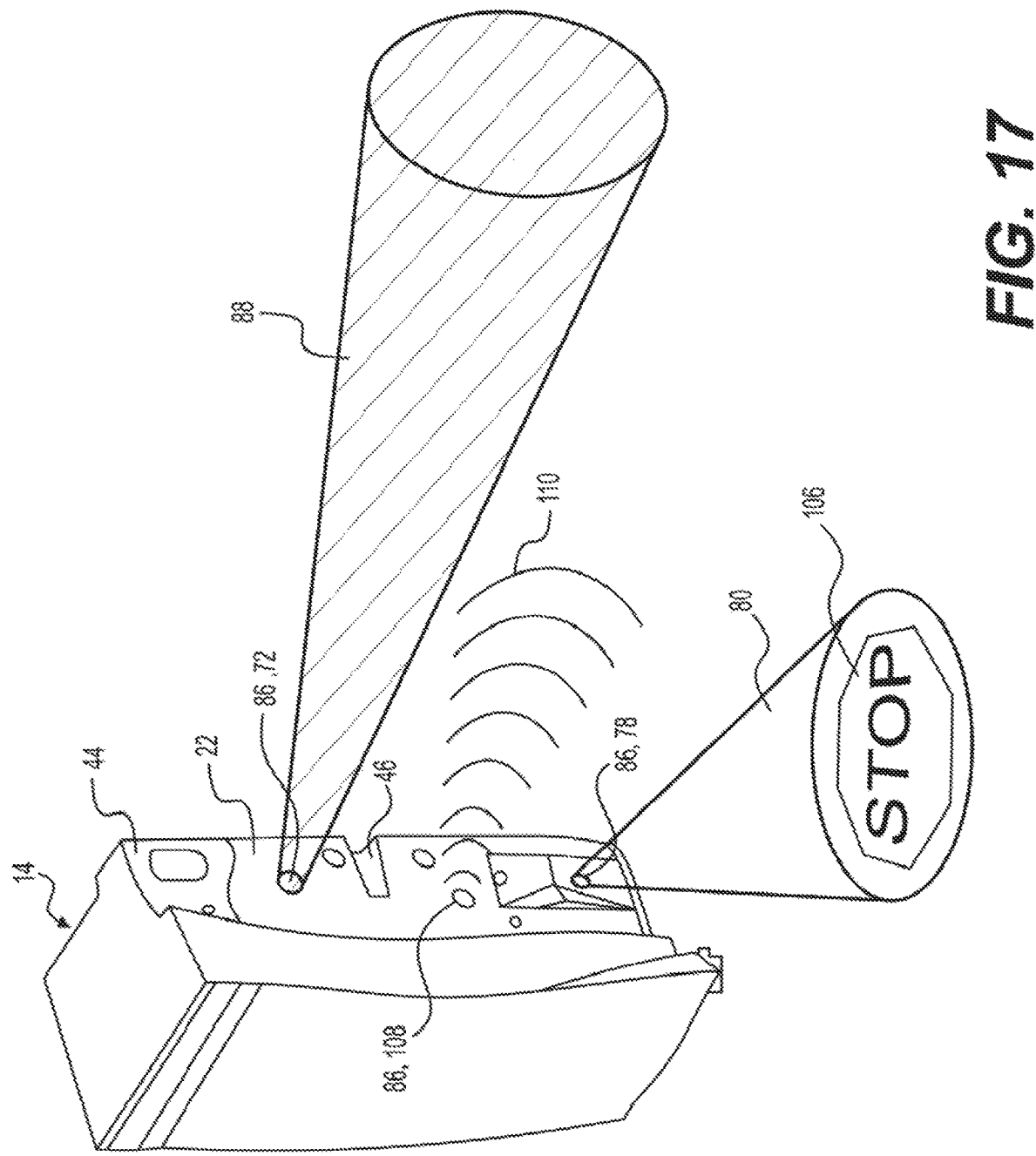

VEHICLE LATCH WITH INTEGRATED RADAR MODULE

CROSS-REFERENCE TO RELATED APPLICATIONS

This application claims the benefit of U.S. Provisional Application No. 62/653,822 filed Apr. 6, 2018, and U.S. Provisional Application No. 62/725,480 filed Aug. 31, 2018. The entire disclosure of the above applications are incorporated herein by reference.

FIELD

The present disclosure relates generally to an electronic latch for a motor vehicle in combination with a radar module, and a method of operating an electronic latch system.

BACKGROUND

This section provides background information related to the present disclosure which is not necessarily prior art.

Motor vehicles are increasingly being equipped with sensors that detect the environment and terrain surrounding the motor vehicle. For example, some vehicles include sensor systems that provide images of the terrain and/or other objects in the vicinity of the vehicle. Sensing systems utilizing radar have also been used to detect the presence and position of objects near the motor vehicle while the vehicle is moving. The signals and data generated by these sensor systems can be used by other systems of the motor vehicle to provide safety features such as vehicle control, collision avoidance, and parking assistance. Such sensing systems are generally used to assist the driver while he or she is driving the motor vehicle and/or to intervene in controlling the vehicle.

Additionally, closure members for vehicles (e.g. doors, lift gates, etc.) are increasingly provided with powered actuation mechanisms capable of opening and/or closing the closure members. Some powered actuation systems include a power-operated device such as, for example, an electric motor and a rotary-to-linear conversion device that are operable for converting the rotary output of the electric motor into translational movement of an extensible member. One example of such as powered actuation system is shown in commonly-owned U.S. Pat. No. 9,174,517. Such power actuated operation can lead to issues with the closure members unintentionally striking surrounding objects or obstacles. For example, an object near the closure member may obstruct the opening or closing of the closure member and/or the closure member may be damaged if opened under power and strikes the obstacle. However, known sensing system or obstacle detection systems do not properly address potential situations involving obstacles.

Thus, there is an increasing need for an obstacle detection system that prevents the closure member from colliding with nearby objects primarily when the vehicle is stationary. Furthermore, other desirable features and characteristics of the present invention will become apparent from the subsequent detailed description and the appended claims, taken in conjunction with the accompanying drawings and the foregoing technical field and background.

SUMMARY

This section provides a general summary of the present disclosure and is not intended to be interpreted as a comprehensive disclosure of its full scope or all of its features, aspects and objectives.

An aspect of the present disclosure is to provide an electronic latch system for a closure member of a motor vehicle that includes a plurality of non-contact object detection (NCOD) sensors fixed to the closure member, and an angle sensor configured to detect an angle of the closure member relative to a body of the motor vehicle. The electronic latch system also includes a controller configured to selectively enable at least one of the NCOD sensors within the plurality of NCOD sensors in response to the angle of the closure member as detected by the angle sensor.

Another aspect of the present disclosure is to provide an electronic latch system for a closure member of a motor vehicle including at least one non-contact object detection (NCOD) sensor fixed to the closure member, and a controller configured to selectively enable the at least one NCOD sensor in response to detecting the position of the closure member.

It is an aspect of the present disclosure to provide an electronic latch for a closure member of a motor vehicle, the electronic latch includes a latch housing configured to be attached to the closure member, and a latching mechanism disposed within the latch housing and configured to hold the closure member in a closed position. The electronic latch also includes a latch actuator configured to drive the latching mechanism between a locked condition and an unlocked condition, and a latch controller configured to provide a drive signal to the latch actuator to cause the latching mechanism to drive the latch actuator into one of the locked condition or the unlocked condition in response to a command signal. The electronic latch further includes a radar module in communication with the latch controller with a radar antenna configured to detect an object in a sensing zone.

It is another aspect of the present disclosure to provide a method of operating an electronic latch system. The method includes the step of monitoring a sensing zone adjacent a motor vehicle by a radar sensor disposed within a closure member of the motor vehicle. The next step of the method is communicating a signal from the radar sensor to a latch controller disposed within the closure member. The step of communicating the signal from the radar sensor to the latch controller is performed using a direct communication path between the radar sensor and the latch controller and without being communicated via an intermediate controller.

The method may further include the closure member being a door defining an inner face; and the plurality of radar sensors including an inner-face sensor configured to project a radar beam through a port in the inner face of the door, and selectively monitoring a given one of the plurality of radar sensors depending upon the position of the closure member comprises monitoring the inner-face sensor with the door in a second position with the inner-face sensor exposed.

In accordance with yet another aspect there is provided a non-contact proximity detection system for a closure member of a motor vehicle including at least one non-contact object detection (NCOD) sensor fixed to the closure member, and a controller configured to selectively enable the at least one NCOD sensor in response to detecting the position of the closure member.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which:

FIG. 9 is a perspective view of an electronic latch within a door of a motor vehicle according to aspects of the disclosure;

FIG. 10 is a perspective view of an electronic latch for a door of a motor vehicle according to aspects of the disclosure;

FIG. 11 is a perspective view of an electronic latch within a door of a motor vehicle according to aspects of the disclosure;

FIG. 17 is a perspective view of an electronic latch for a door of a motor vehicle according to aspects of the disclosure;

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to an electronic latch system 20 of the type well-suited for use in many applications. More specifically, an electronic latch system with at least one non-contact obstacle detection (NCOD) sensor, and which may include a plurality of a non-contact obstacle detection (NCOD) sensors, for a motor vehicle closure member and methods of operating the electronic latch system is disclosed are disclosed herein. The electronic latch system is disclosed of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. In some embodiments, the plurality of NCOD sensors are radar sensors. However, some or all of the NCOD sensors may use other sensing means such as infrared or sonar.

Figure 1:
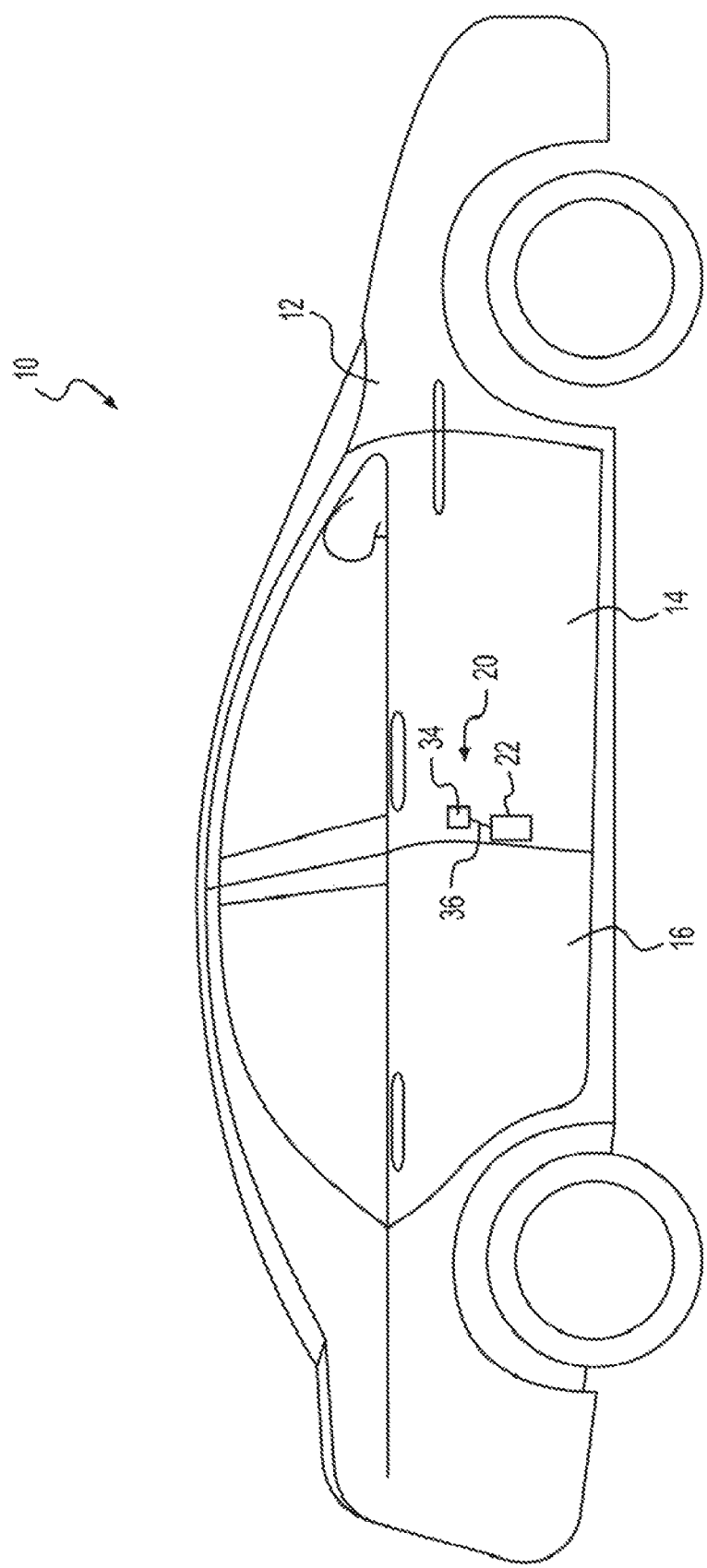
FIG. 1 is a side view of a motor vehicle according to aspects of the disclosure.

Referring to the Figures, wherein like numerals indicate corresponding parts throughout the several views, a proximity detection system referred to in an illustrative embodiment as an electronic latch system 20 for a motor vehicle 10 is disclosed. Referring to FIG. 1, a motor vehicle 10 according to some embodiments is shown having a body 12, a front side door 14, and a rear side door 16, both pivotably attached to the body 12. The motor vehicle 10 includes several closure members, which may also be called closures, including the front and rear side doors 14, 16. An electronic latch 22, which may also be called an e-latch for short, is located within the front side door 14. The electronic latch 22 may also be located at other positions, for example within the rear side door 16, or within another closure member, such as a liftgate, tailgate, and the like without limitation. A remotely-mounted radar module 34 is also located within the front side door 14 and is in communication with the electronic latch 22 by a signal cable 36. Radar module 34 may also be located locally to the electronic latch 22 in a manner as will be described herein below.

Figure 18:
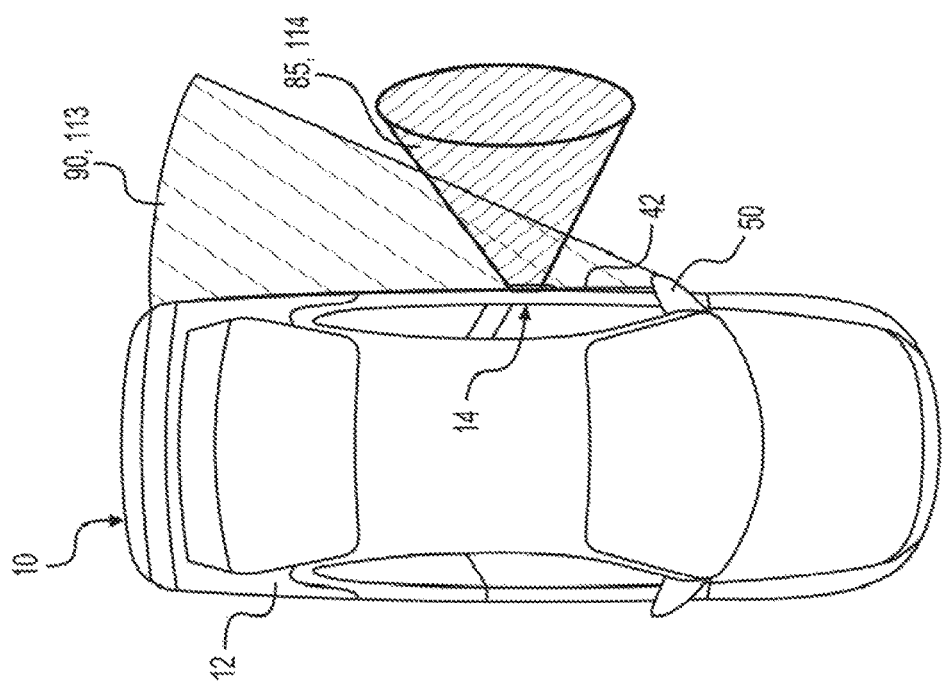
FIG. 18 is a top view of a motor vehicle with a front side door in a closed position according to aspects of the disclosure.

In some embodiments an NCOD sensor, also generally referred to as a proximity sensor, such as a radar sensor, is disposed adjacent an outside face of the door 14 and is configured to sense an object within a first sensing zone that extends outwardly from the outside face of the door 14 when the door 14 is in a closed position, and may also be configured to sense an object within the first sensing zone 114 that extends outwardly from the outside face of the door 14 when the door 14 is in an opened position (as illustratively shown in FIG. 22 for example) and/or when the door 14 is closed (as illustratively shown in FIG. 18 for example). Such an outward-facing radar sensor may be called an outside-face sensor. The first sensing zone 114 may be sensed by the outside-face sensor using an outward radar beam 85, which is described in more detail below with reference to FIG. 18.

Figure 2:
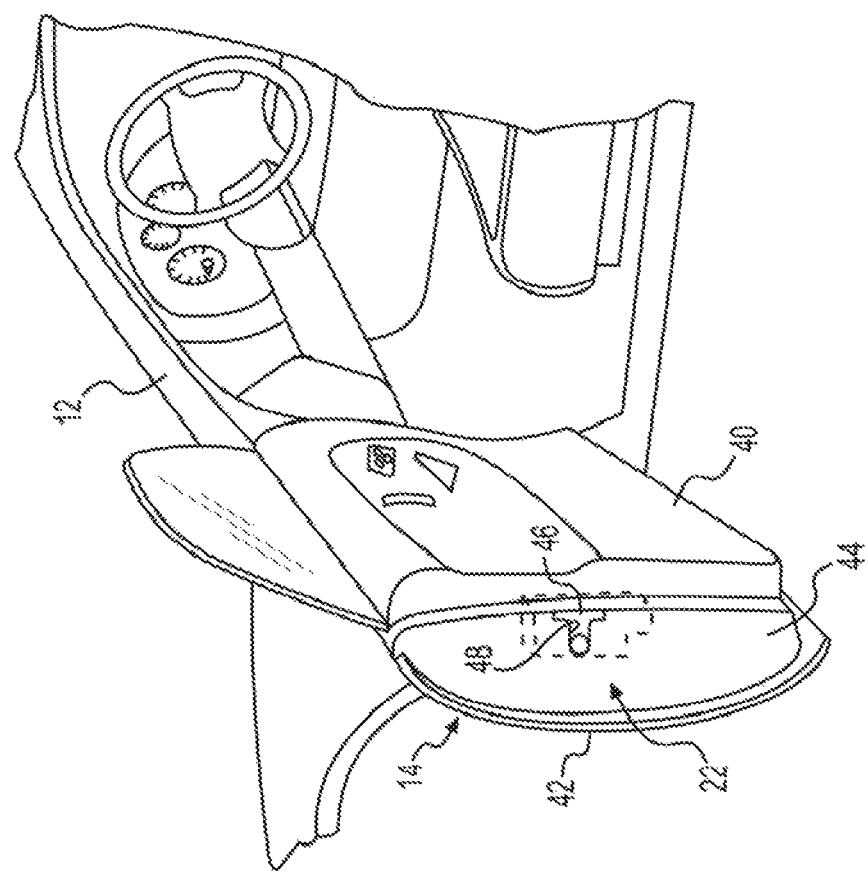
FIG. 2 is a perspective view of a front side door area of a motor vehicle according to aspects of the disclosure.

FIG. 2 is a perspective view of the front side door 14 according to some embodiments. The front side door 14, as shown in FIG. 2, includes an inside door panel 40 and an outside door panel 42. The inside door panel 40 faces the interior of the motor vehicle 10 with the front side door 14 in a closed position. The outside door panel 42 is generally parallel and spaced apart from the inside door panel 40 to define an exterior portion of the motor vehicle 10 with the front side door 14 in the closed position. The front side door 14 also includes a shut face panel 44 extending between and generally transverse to the inside door panel 40 and the outside door panel 42. In some embodiments, the each of the panels 40, 42, 44 of the front side door 14 are formed of sheet metal that is joined to make the front side door 14. The panels 40, 42, 44 may be joined by welding, adhesive, or by a fastener. Alternatively or additionally, parts of one or more of the panels 40, 42, 44 may be formed from a single piece of metal that is bent or otherwise formed into the individual panels 40, 42, 44. In some embodiments, at least one of the panels 40, 42, 44 of the front side door 14 may be formed of a non-metallic material such as a polymer, plastic, composite, organic, or other like materials, that is transmissive to electromagnetic radiation such as radar signals, to construct the front side door 14, or part of the front door 14. The latch 22 is shown in phantom lines as being located inside of the front side door 14 immediately beneath the shut face panel 44.

Figure 3:
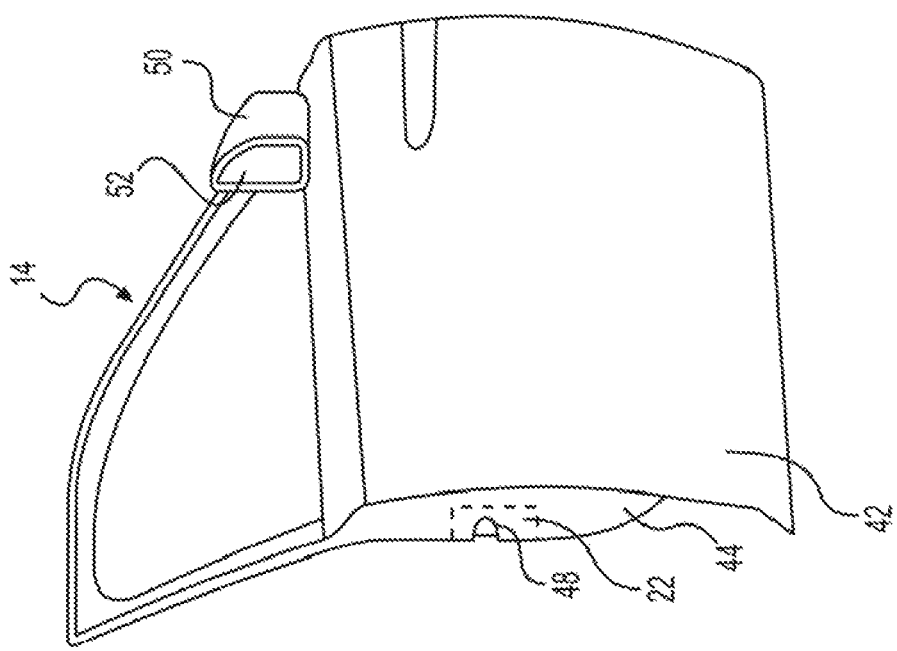
FIG. 3 is a perspective view of a front side door of a motor vehicle according to aspects of the disclosure.

In some embodiments, and as also shown in FIG. 2, the latch 22 defines a fish mouth opening 46 that is configured to receive a striker (not shown) that is fixed to the body 12 of the vehicle 10 in order for the latch 22 to engage the striker for securing the door 14 in a closed position. The shut face panel 44 defines a fish mouth aperture 48 that is aligned with the fish mouth opening 48 of the latch 22 to receive the striker into the latch 22. FIG. 3 shows a perspective view of the front side door 14 from outside of the vehicle 10. In some embodiments, and as shown in FIG. 3, the front side door 14 includes an exterior mirror housing 50 holding an exterior rear view mirror 52.

Figure 4:
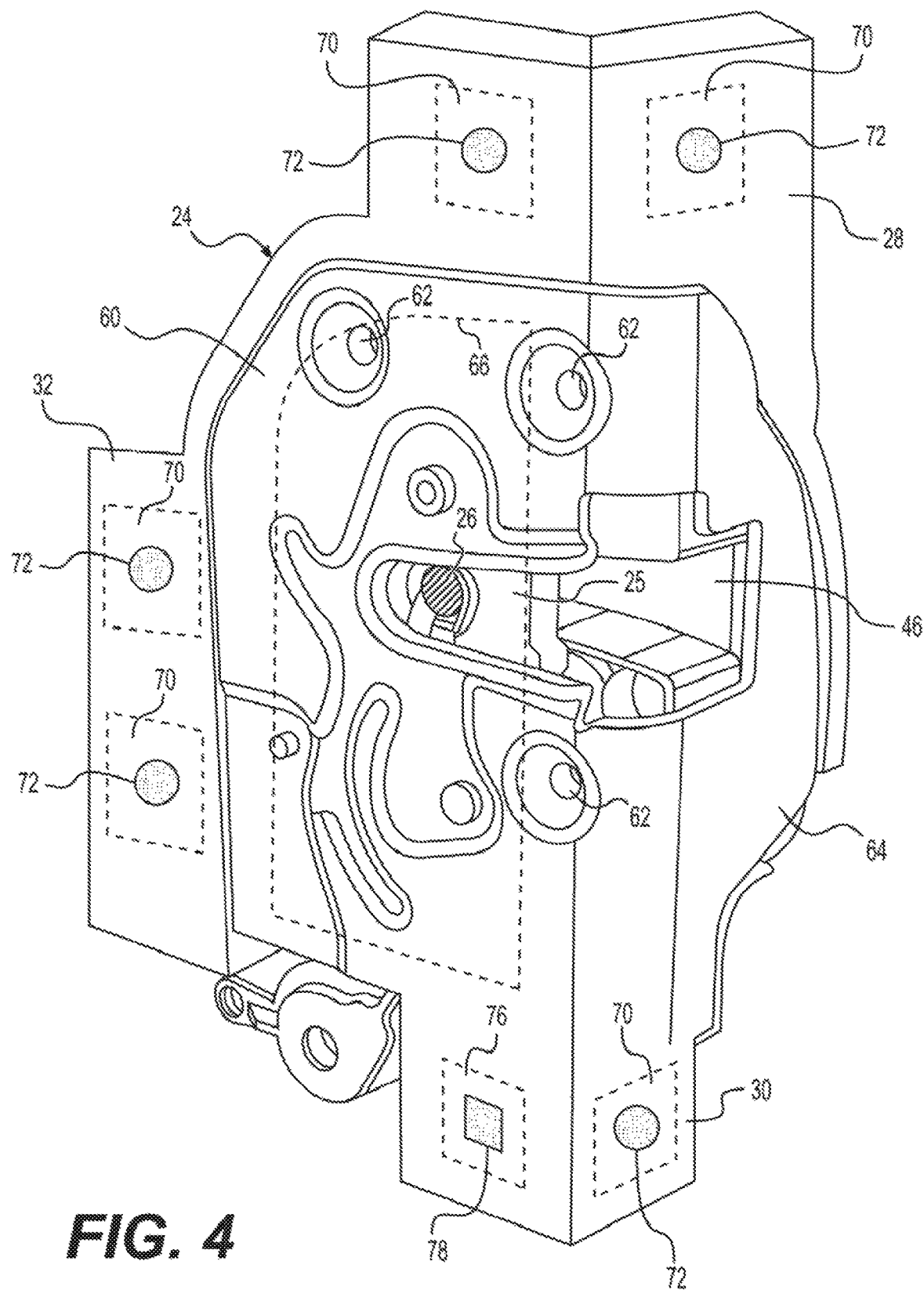
FIG. 4 is a perspective view of an electronic latch for a door of a motor vehicle according to aspects of the disclosure.

FIG. 4 shows an example of the electronic latch 22 in accordance with some embodiments. The electronic latch 22 includes a latch housing 24 holding a latching mechanism 25 that selectively engages and retains the striker 26, which is fixed to the body 12 of the vehicle 10, for latching and/or locking the door 14 in a closed position relative to the body 12 of the vehicle 10. The electronic latch 22 may include a latch actuator (not shown) configured to drive the latching mechanism 25 between a locked condition and an unlocked condition. Electronic latch 22 may be embodied for example as a latch described in commonly owned U.S. Pat. No. 9,353,556 entitled "Electrical vehicle latch", the entire contents of which are incorporated herein by reference.

The electronic latch 22 includes a structural plate 60 defining a plurality of mounting holes 62 for attaching the latch housing 24 to the shut face panel 44 of the door 14, with the structural plate 60 flush against an inside surface of the shut face panel 44. The structural plate 60 includes a frustoconical recess surrounding each of the mounting holes 62 for receiving a counter-sunk screw (not shown). A side plate 64 extends perpendicularly to the structural plate 60. The structural plate 60 is illustratively formed from a high strength material, such as metal. The structural plate 60 and the side plate 64 together define the fish mouth opening 46. An electronic latch printed circuit board (PCB), also called an e-latch PCB 66 is located inside the electronic latch 22 behind the structural plate 60 and is illustratively shown in phantom lines. Illustratively, PCB 66 is shown extending parallel to structural plate 60, but in other configurations, PCB 66 may extend parallel to side plate 64. The e-latch PCB 66 includes electronic components for controlling and/or monitoring operation of the electronic latch 22. The e-latch PCB 66 may hold an e-latch controller 170 (not shown on FIG. 4), which is configured to provide a drive signal to the latch actuator to cause the latching mechanism to drive the latch actuator into one of the locked condition or the unlocked condition in response to a command signal, for example received from a Body Control Module 138 of the vehicle 10, or from a door handle switch or sensor or FOB, or the like for example. The e-latch PCB 66 may monitor one or more sensors or switches to determine one or more positions and/or conditions of the door 14 and/or the electronic latch 22. For example, the e-latch controller 170 and/or other components on the e-latch PCB 66 may monitor switches, or for example hall sensors, to determine if the door 14 is opened, closed, or ajar, and if the electronic latch 22 is in a locked or an unlocked condition. For example, controller 170 may monitor a hall sensor configured to detect the position of the latching mechanism 25, illustratively such as ratchet for example, including a primary striker capture position indicating the door 14 is in a fully closed position, or a secondary striker capture position indicating the door 14 is in the partially closed position.

The latch housing 24 may include one or more housing extensions 28, 30, 32 for accommodating components of one or more NCOD sensors. For example, and as shown in FIG. 4, an upper housing extension 28 extends vertically upwardly beyond the structural plate 60 and/or the side plate 64. Alternatively or additionally, and as also shown in FIG. 4, a lower housing extension 30 extends vertically downwardly beyond the structural plate 60 and/or the side plate 64. Alternatively or additionally, and as also shown in FIG. 4, a horizontal housing extension 32 extends horizontally outwardly beyond the structural plate 60. One or more housing extensions 28, 30, 32 may be formed from a radar transmissive material, such as plastic or the like for allowing radar signals to pass through the one or more housing extensions 28, 30, 32 without any or without significant attenuation of the radar signal.

In some embodiments, and as shown in FIG. 4, each of the housing extensions 28, 30, 32 includes one or more sensor PCBs 70 with a radar sensor 72 disposed thereupon. In some embodiments, and as shown in FIG. 4, the sensor PCBs 70 each have a single radar sensor 72 and are separate and independent from the e-latch PCB 66. In other embodiments, one or more of the sensor PCBs may hold two or more radar sensors 72 and/or other components. The sensor PCBs 70 may each be in communication with the e-latch PCB 66 by one or more wires or cables such that for example, the radar sensor 72 may be in direct electrical communication with the controller 170. Radar sensor 72 is illustratively in electrical communication with controller 170 to receive signals from controller 170, such as power signals and/or control signals, and to provide signals to controller 170, such as raw radar data and/or processed decision signals based on processing of the raw radar signals. The sensor PCBs 70 may be connected together and/or to the e-latch PCB 66 in a star topology or a daisy-chain, or any other configuration. In some embodiments, one or more of the sensor PCBs 70 may be integrally formed with the e-latch PCB 66. Alternatively or additionally, one or more of the sensor PCBs 70 may connect directly to the e-latch PCB 66, for example with one or more pins, slots, and/or another physical and/or electrical connection.

In some embodiments, and as shown in FIG. 4, the electronic latch 22 may include a projector PCB 76 holding a light source 78. The projector PCB 76 may be stand-alone, connected to the e-latch PCB 66 via a wire or cable. Alternatively, the projector PCB 76 may be integrally formed with one of the sensor PCBs 70 and/or with the e-latch PCB 66.

Figure 5:
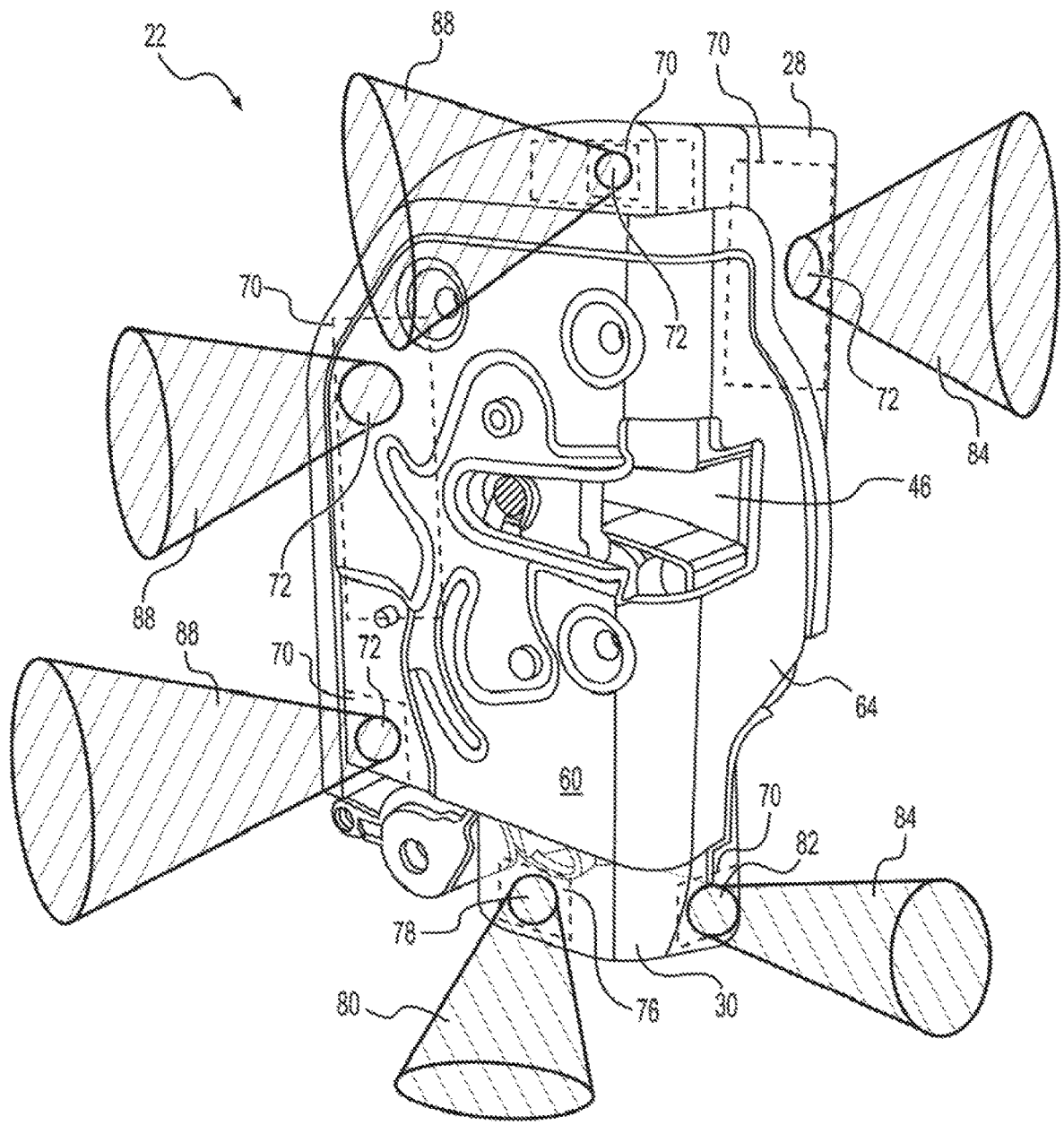
FIG. 5 is a perspective view of an electronic latch for a door of a motor vehicle according to aspects of the disclosure.

FIG. 5 shows the electronic latch 22 of FIG. 4 in functional operation. Specifically, FIG. 5 shows a projected light beam 80 being projected outwardly from the light source 78. FIG. 5 also shows two of the radar sensors 72 disposed in a plane with the side plate 64 each projecting an inward radar beam 84. FIG. 5 also shows three of the radar sensors 72 disposed behind or co-planar with the structural plate 60, each projecting a shut-face radar beam 88.

Figure 6:
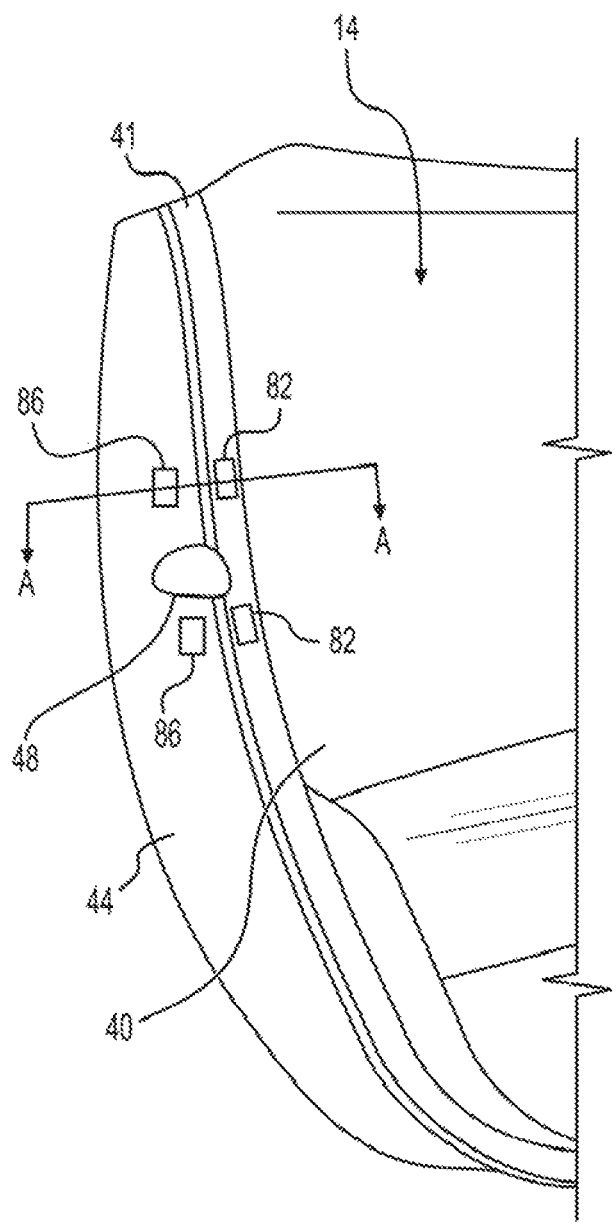
FIG. 6 is a perspective view of a portion of a side door of a motor vehicle according to aspects of the disclosure.

Referring now to FIG. 6, a perspective view of the front side door 14 in an opened or partially-opened position is shown. The front side door 14 includes an inner edge 41 adjacent and extending perpendicularly to the shut face panel 44. In some embodiments, the inner edge 41 may be a region of the inside door panel 40 which is painted metal and which is not covered with trim such as plastic or fabric. The inner edge 41 defines a pair of inward-facing ports 82 that are each aligned with a corresponding inward facing one of the radar sensors 72 for allowing the inward radar beams 84 to project outwardly from the inside door panel 40 and for allowing reflected inward radar beams to be received there through. The inward facing ones of the radar sensors 72 may also be called inner sensors, and their associated inward radar beams 84 may sense objects within a second sensing zone 113 that extends outwardly from the inside door panel 40. The inner sensors and their associated inward radar beams 84 may be named because of their respective positions, facing inwardly toward the interior of the vehicle 10 when the door 14 is in the closed position.

Similarly, the shut face panel 44 defines a pair of shut-face ports 86, which are each configured aligned with a corresponding one of the radar sensors 72 for allowing the shut-face radar beams 88 to project outwardly from the shut face 44 of the door 14 and for allowing reflected shut-face radar beams to be received there through. The ones of the radar sensors 72 that are aligned with the shut-face ports 86 may also be called shut face sensors, and their associated shut-face radar beams 88 may sense objects within a third sensing zone 116 that extends outwardly from the shut face panel 44. Inward-facing ports 82 and shut-face ports 86 may be apertures, such as holes, formed in the sheet metal of panels 40, 44, or may be another type of radar transparent port for allowing transmitted and reflected waves emitted and/or received from sensors 72 to pass through without or significantly without attenuation.

Figure 8:
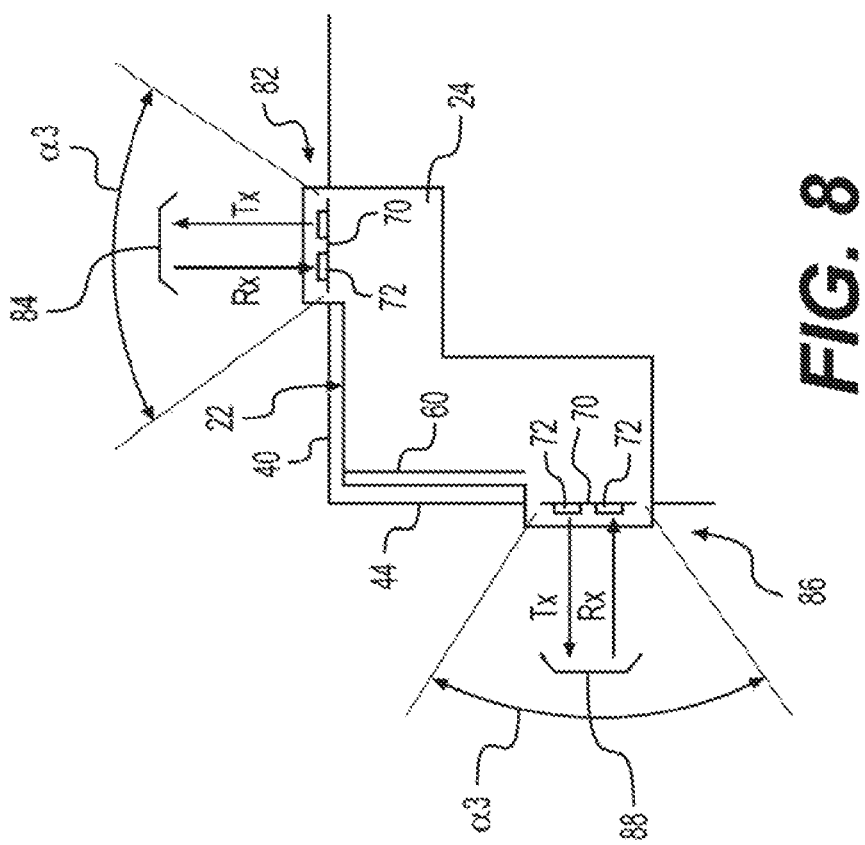
FIG. 8 is a cross-sectional view of the door of FIG. 6 along plane A-A according to aspects of the disclosure.
Figure 7:
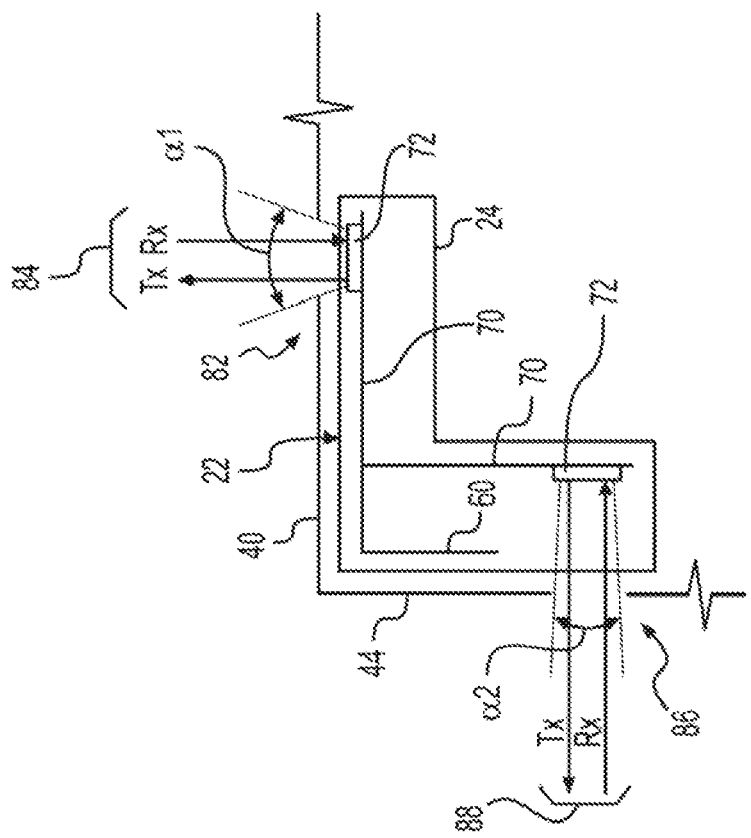
FIG. 7 is a cross-sectional view of the side door of FIG. 6 along plane A-A according to aspects of the disclosure.

FIGS. 7-8 are partial close-up cross-sectional views of the front side door 14 taken through a plane along line A-A, illustrating the alignment of the shut face port 86 and the inward-facing port 82 with the radar sensors 72 integrated in the latch housing 24. In this illustration, two radar sensors 72 are provided in the e-latch 22 on perpendicularly extending printed circuit boards 70, with each of the radar sensors 72 having a different detection zone or coverage, as shown by the corresponding radar beams 84, 88. In some embodiments, and as shown in FIG. 7, the radar sensors 72 are recessed behind each of the corresponding ports 82, 86, illustratively shown as an aperture or hole in the sheet metal of panels 40, 42, 44. In some embodiments, and shown in the example of the radar sensor 72 adjacent the inward-facing port 82, the radar sensor 72 is at a side of the latch 22 immediately adjacent the associated panel of the door 14 and recessed behind the corresponding port 82. The resulting inward radar beam 14 has a first spread angle $\alpha 1$ that is limited by the characteristics of the radar sensor 72 and the port 82. In other embodiments, and as shown in the example of the radar sensor 72 adjacent the shut-face port 86, the radar sensor 72 is at a side of the latch 22 spaced away from the associated panel of the door 14 and recessed behind the corresponding port 82. The resulting shut-face radar beam 14 has a second spread angle $\alpha 2$ that is limited by the characteristics of the radar sensor 72 and the port 82 and which is narrower than the first spread angle $\alpha 1$. In an embodiment, panels 40, 42, 44 or a portion of panels 40, 42, 44, may be formed from a radar transmissive material, such as a composite or plastic material for example, an aperture or hole may not be required.

FIG. 8 shows a cross-section of other embodiments in which the radar sensors 72 extend through the corresponding ports 82, 86. For example, the one or more housing extensions 28, 30, 32 enclosing the radar sensors 72 may be provided to extend through the ports 82, 86 and configured to seal the ports 82, 86 when the latch 22 is mounted to the door 14. For example a radome 96 may be positioned within ports 82, 86 or may be configured to project from ports 82, 86. In some embodiments, portions of one or more of the radar sensors 72, such as a radar antenna, including for example transmit and/or receive antennas, may extend or protrude through a corresponding one of the ports 82, 86. Other portions of the radar sensors 72 may remain recessed within the door 14. As shown in FIG. 8, each of the radar beams 84, 88 may have a third spread angle $\alpha 1$ which is wider than each of the first and the second spread angles $\alpha 1$, $\alpha 2$, described above with reference to FIG. 7.

FIG. 9 shows a partial perspective view of a door 14 including an e-latch 22 in accordance with some embodiments. Specifically, the e-latch 22 includes a housing 24 with a structural plate 60 and a side plate 64, which each may be made of metal. The e-latch 22 includes a pair of sensor PCBs 70, with a plurality of radar sensors 72 (for at least one of transmit and receive patch antennas) disposed upon each of the sensor PCBs 70. The sensor PCBs 70 are disposed perpendicularly to one-another and each of the sensor PCBs 70 is spaced away from the housing 24 to prevent the metal plates 60, 64 from interfering with operation of the radar sensors 72. The inside door panel 40 defines a single, common inward facing port 82 overlying all of the radar sensors 72 disposed upon a corresponding one of the sensor PCBs 70. Likewise, the shut face panel 44 defines a single, common shut-face port 86 overlying all of the radar sensors 72 disposed upon a corresponding one of the sensor PCBs 70. A cover, such as a plastic plug (not shown) may be disposed in one or both of the ports 82, 86 for protecting the radar sensors 72 from contaminants such as dust and/or moisture while allowing electromagnetic waves, for example transmitted and/or received electromagnetic radar waves to pass through. Alternatively, the sensor PCB 70 may be provided and aligned with the aperture in the door 14 formed by the fish mouth opening 46 and a port formed in the metal plates 60, 64.

FIG. 10 shows a perspective view of an e-latch system 20 in accordance with some embodiments. Specifically, FIG. 10 shows an electronic latch 22 and a remotely-mounted radar module 34, with a signal cable 36 extending therebetween. In some embodiments, the electronic latch 22 may have one or more radar sensors 72 integrated therein. In other embodiments, the radar sensors 72 may all be located remotely from the electronic latch 22. In some embodiments, and as shown in FIG. 10, the remotely-mounted radar module 34 includes a sensor PCB 70 with a radar sensor 72 disposed thereupon for transmitting and receiving radar beams 84, 88, which may be used for non-contact object detection. In some embodiments, the remotely-mounted radar module 34 includes a sensor PCB 70 with a radar sensor 72 configured to transmit raw unprocessed radar received signal data captured by the receive patch antenna or antennas to the latch controller 170 for processing by the controller 170 to determine if an object is present or absent in an associated sensing zone 112, 113, 114, 116. Controller 170 may be configured to supply electrical power to the radar sensor 72 and receive radar data over the signal cable 36. In some embodiments, the remotely-mounted radar module 34 includes a sensor PCB 70 with a radar sensor 72 including a signal processor unit for processing the raw radar received signal data captured by the receive patch antenna or antennas locally to the remotely-mounted radar module 34 and configured to transmit a data flag, for example as message or signal representing a determination by radar sensor 72 that an object is detected or not, as well as other determinations such as a velocity of the object, an angle or position of the object, and a size of the object, which may be encoded in a simple communication message indicating to the controller 170 that the radar module 34 has determined or not if an object is present or absent an associated sensing zone 112, 113, 114, 116. Controller 170 may be configured to supply electrical power to the radar sensor 72 and receive the data flag over the signal cable 36. FIG. 11 shows an example e-latch system 20 disposed within a vehicle door 14 that includes two of the remotely-mounted radar modules 34 disposed within the vehicle door 14 adjacent the inside door panel 40 and two of the remotely-mounted radar modules 34 disposed within the vehicle door 14 adjacent to the shut face panel 44. A signal cable 36 connects each of the remotely-mounted radar modules 34 to the electronic latch 22. In other embodiments, there may be more or fewer of the remotely-mounted radar modules 34 adjacent either or both of the door panels 40, 44.

Figure 14:
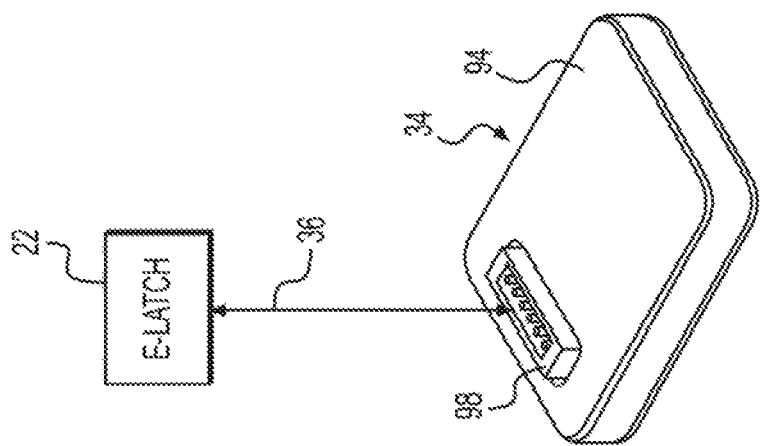
FIG. 14 is perspective view showing a back side of the radar module of FIG. 12 according to aspects of the disclosure.
Figure 13:
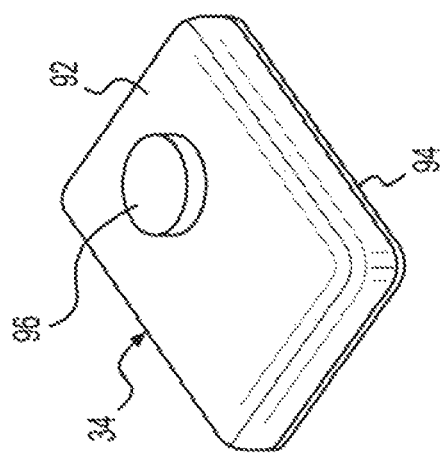
FIG. 13 is perspective view showing a front side of the radar module of FIG. 12 according to aspects of the disclosure.
Figure 12:
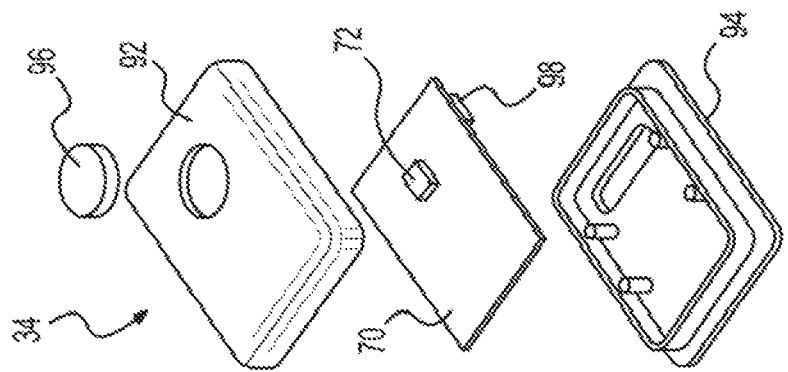
FIG. 12 is an exploded view of a radar module according to aspects of the disclosure.

FIGS. 12-14 show various views of a remotely-mounted radar module 34 in accordance with some example embodiments. Specifically, FIG. 12 shows an exploded view of a remotely-mounted radar module 34 with a radar sensor 72 disposed upon a sensor PCB 70 that is held between a front cover 92 and a back cover 94. A radome 96 covers the radar sensor 72 and is transmissive to radar beams passing through therethrough, while blocking contaminants, such as dust and/or moisture from coming into contact with the radar sensor 72. An electrical connector 98 is disposed on the sensor PCB 70 opposite the radar sensor 72 for allowing electrical connection to the e-latch 22. FIG. 13 shows a front view of the remotely-mounted radar module 34 of FIG. 12 in an assembled state. FIG. 14 shows a part perspective view, part block diagram, showing the back cover 94 of the remotely-mounted radar module 34, with an electrical interconnection to the e-latch 22 via a signal cable 36. In some embodiments, the signal cable 36 may provide electrical power to the remotely-mounted radar module 34. In other embodiments, the remotely-mounted radar module 34 may be powered from a separate line and/or from a different power source that is independent of the e-latch 22.

Figure 16:
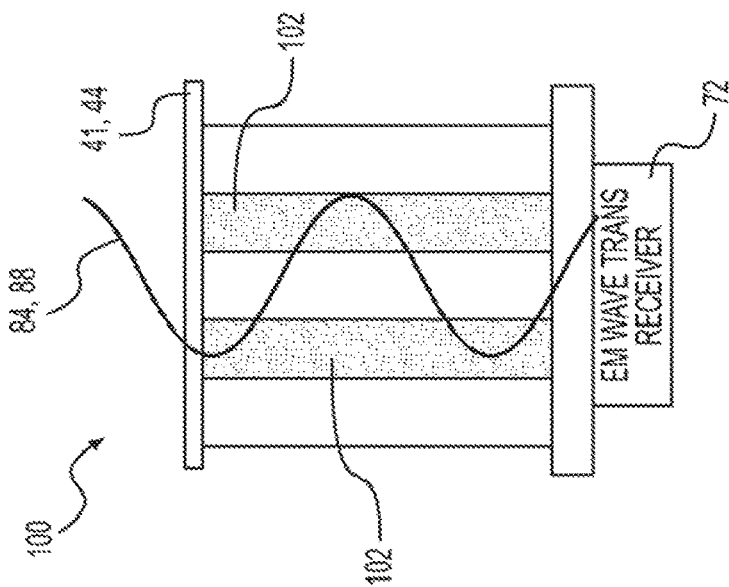
FIG. 16 is a schematic diagram of a radar transmissive region according to aspects of the disclosure.
Figure 15:
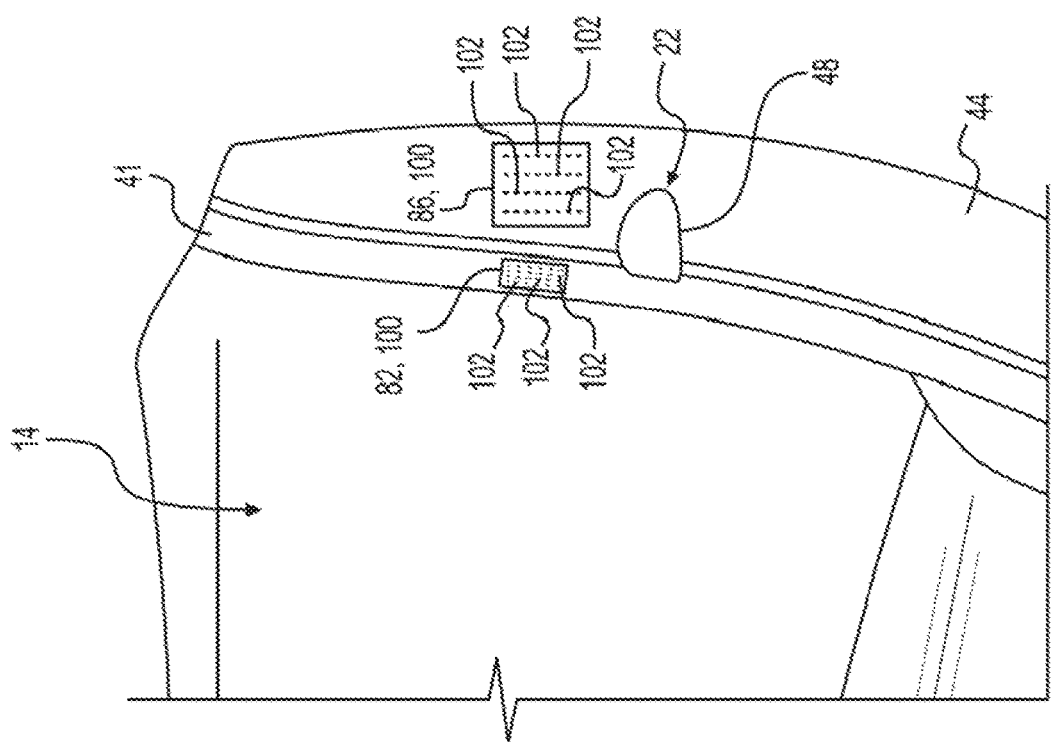
FIG. 15 is a perspective view of a portion of a door of a motor vehicle according to aspects of the disclosure.

FIG. 15 shows a partial perspective view of a vehicle door 14 in which the inward-facing port 82 is formed from an Radio Frequency (RF) transmissive region 100 in the inner edge 41 of the inside door panel 40, and in which the shut-face port 86 is formed from another RF transmissive region 100 in the shut face panel 44. FIG. 16 shows a schematic diagram of the RF transmissive regions 100 formed using the teachings of commonly owned provisional patent having Ser. No. 62/725,480, entitled "Automotive Radar/Lidar behind Reflective Surfaces", the entirety of which is incorporated by reference herein, and referred to for illustrating an example of a RF transmissive port. The RF transmissive regions 100 may each comprise a plurality of parallel gaps 102 as shown in FIG. 16, and the spacing between adjacent ones of the gaps 102 may be tuned to match the frequency or wavelength of the radar wave. Thus, radar waves having misaligned polarization are not allowed to pass through the ports 82, 86. In some embodiments, a filler that is electromagnetically transparent can fill the gaps 102 in the grid formed in the sheet panel 40, 42, 44, and a paint can be form outer surface, concealing the ports 82, 86.

FIG. 17 shows a partial perspective view of a vehicle door 14 including a shut face panel 44 and with an e-latch 22 defining multiple shut-face ports 86 each approximately coplanar with the shut face panel 44. More specifically, FIG. 17 shows one of the shut-face ports 86 aligned with a radar sensor 72 for projecting a shut-face radar beam 88. Another one of the shut-face ports 86 in the e-latch 22 is aligned with an audio source 108 for transmission of an audio signal 110. The audio source 108 may be a speaker, a buzzer, chime, or other device capable of generating the audio signal 110, which may be used to warn people in the vicinity of the vehicle 10 of potential danger. Yet another one of the shut-face ports 86 in the e-latch 22 is aligned with the light source 78 for transmitting the projected light beam 80 outwardly from the e-latch 22. Specifically, the projected light beam 80 may warn people of potential dangers. In some embodiments, the audio signal 110 and/or the projected light beam 80 may be activated and/or change in character or intensity by the controller 170 in response to detection of an object by one or more non-contact object detection sensors, such as one of the radar sensors 72. In some embodiments, the audio signal 110 and/or the projected light beam 80 may be activated and/or change in character or intensity in response to the door 14 being moved and/or being in a specific position. For example, the audio signal 110 and/or the projected light beam 80 may be activated to generate a brief warning signal when the door 14 is first started to be partially opened. In some embodiments, and as shown in FIG. 17, the projected light beam 80 may define a warning image 106 upon a surface. For example, the warning image 106 may appear as a STOP sign or any other visual image. The warning image 106 may change in color and/or shape and may appear as an animated graphic. In some embodiments, the warning image 106 may define two or more different symbols or graphic images in response to different conditions. For example, a yellow warning graphic may be displayed immediately before the door 14 is opened, which may change to a red stop sign after the door 14 begins to open. The red stop sign may flash in response to an object being detected in the vicinity of the door 14. Similarly, different audio signals 110 may be used in response to different conditions.

FIG. 18 is an overhead view of a vehicle 10 in accordance with some embodiments. Specifically, FIG. 18 shows the vehicle 10 with a front side door 14 in a closed position with an outward radar beam 85 projecting outwardly therefrom. Such an outward radar beam 85 may be used to detect objects within a sensing zone 113 adjacent the vehicle 10 with the door 14 in the closed position, and provide surrounding environmental information for making a determination to prevent the door 14 from being commanded to move to an open position from the illustrated closed position, or for example provide information to a vehicle system, such as a blind spot detection system or lane departure system, or to the Body Control Module, as examples. FIG. 18 also shows an exterior mirror radar beam 90 that may be projected from the exterior mirror housing 50 for sensing objects within a mirror sensing zone 113 adjacent the vehicle 10, and particularly for non-contact object detection objects with the front side door 14 in the closed position. Exterior mirror radar beam 90 generated by a radar sensor 72 mounted within exterior mirror housing 50 and which is provided in electrical communication with controller 170 may provide proximity detection data (raw radar data or flags) in combination with outward radar beam 85 for increasing the detection zone adjacent the vehicle 10.

Figure 19:
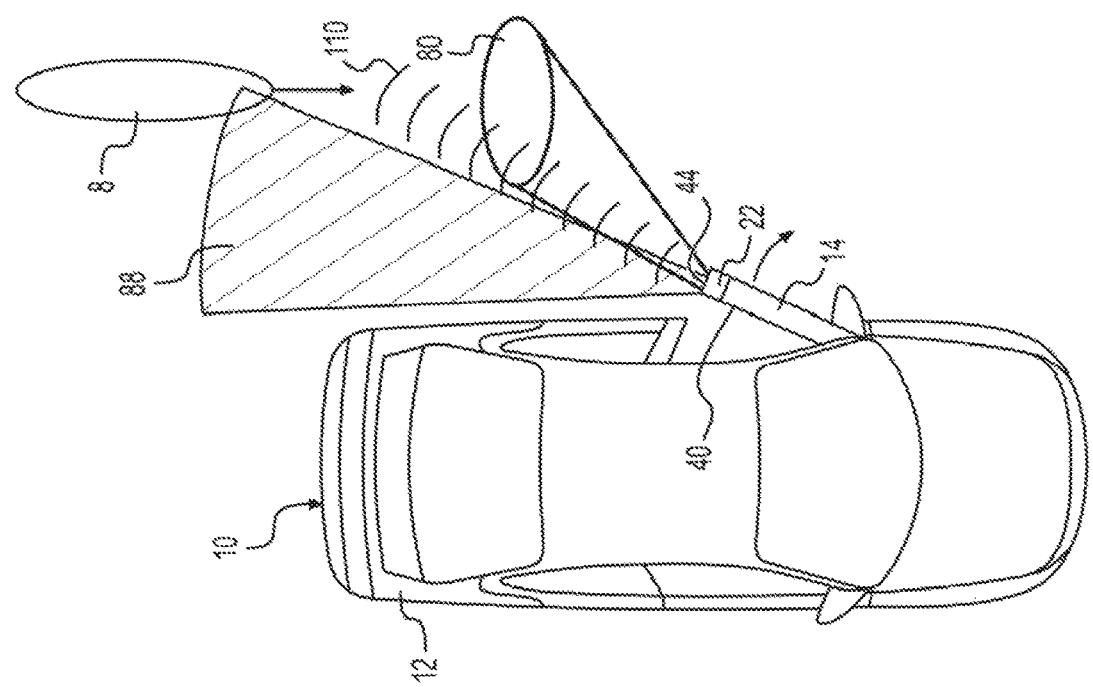
FIG. 19 is a top view of a motor vehicle with a front side door in a first partially-opened position according to aspects of the disclosure.

FIG. 19 shows an overhead view of a vehicle 10 in accordance with some embodiments. Specifically, FIG. 19 shows the vehicle 10 with a front side door 14 in a first partially-opened position, which may include a range of angular positions relative to the vehicle body 12. The shut face 44 is exposed, allowing the shut-face radar beam 88 to be used for non-contact object detection around the vehicle 10. In the example shown in FIG. 19 a cyclist 8 approaching the vehicle 10 from behind may be sensed by the shut-face radar beam 88. In some embodiments, the functions performed by the exterior mirror radar beam 90 when the front side door 14 is closed, may be performed instead by the shut-face radar beam 88 when the front side door 14 is in first partially-opened position, the shut-face radar beam 88 being able to monitor a detection zone that is obstructed by door 14 as sensed by exterior mirror radar beam 90 as door 14 moves from the closed position to the partially opened position. The projected light beam 80 and the audio signal 110 are each enabled to warn the cyclist 8 of potential danger due to the opening front side door 14. In some embodiments, the shut-face radar beam 88 may be used in this configuration for detecting objects in front of the rear side door 16, which may be advantageously used to prevent the rear side door 16 from being opened into contact with a detected object.

Figure 20:
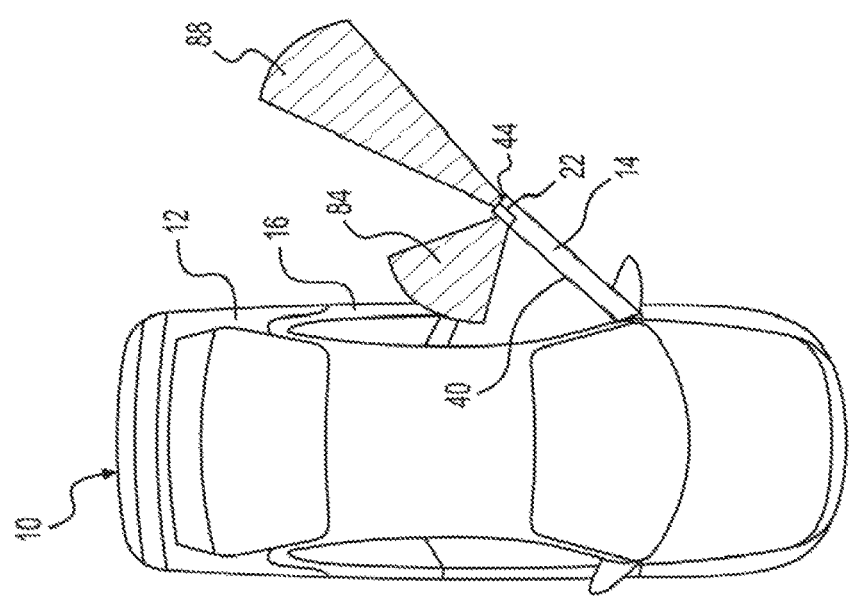
FIG. 20 is a top view of a motor vehicle with a front side door in a second partially-opened position according to aspects of the disclosure.

FIG. 20 shows an overhead view of a vehicle 10 in accordance with some embodiments. Specifically, FIG. 20 shows the vehicle 10 with a front side door 14 in a second partially-opened position, opened beyond the first partially-opened position shown in FIG. 19. The second partially-opened position may include a range of angular positions relative to the vehicle body 12. In this position, the inward radar beam 84 may be enabled by controller 170, as shown for detecting objects between the front side door 14 and the body 12 of the vehicle 10. Such objection detection may be used to stop the front side door 14 from closing into contact with the object. In some embodiments, the inward radar beam 84 may be used in this configuration for detecting objects outside of the rear side door 16, which may be advantageously used to prevent the rear side door 16 from being opened into contact with a detected object. Additionally or alternatively, a warning signal may be generated in response to a detected object, which may signal potential danger due to contact with the closing front side door 14 and/or due to contact to an opening rear side door 16.

Figure 21:
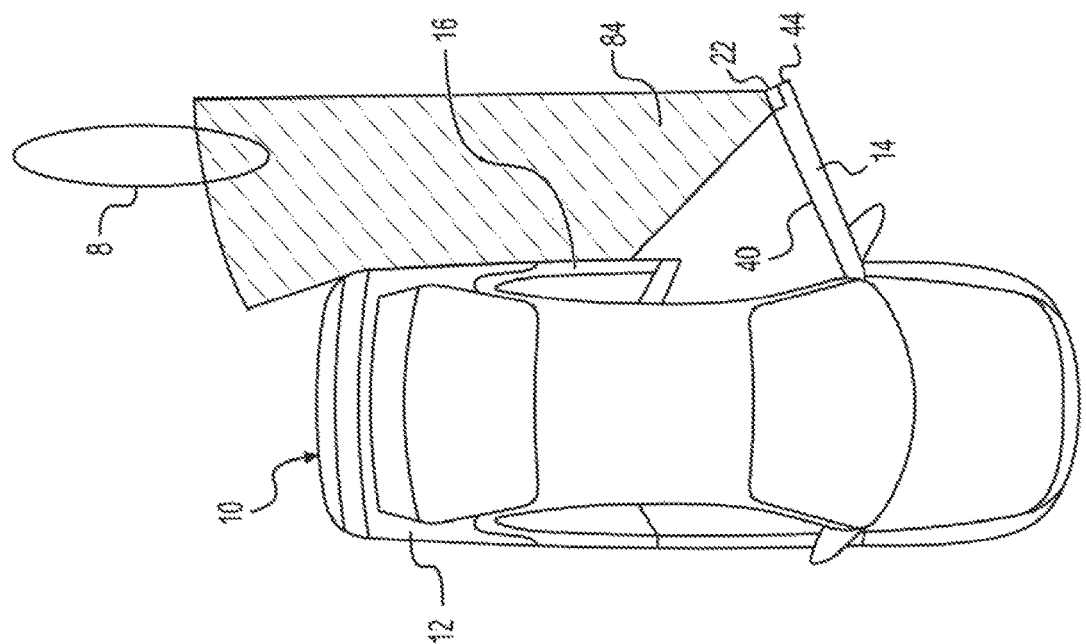
FIG. 21 is a top view of a motor vehicle with a front side door in a full opened position according to aspects of the disclosure.

FIG. 21 shows an overhead view of a vehicle 10 in accordance with some embodiments. Specifically, FIG. 21 shows the vehicle 10 with a front side door 14 in a fully-opened position. The fully-opened position may include a range of angular positions relative to the vehicle body 12 beyond the second partially-opened position. In the fully-opened position, the inward radar beam 84 may be enabled, as shown for detecting objects around and adjacent the vehicle 10. In some embodiments, the functions performed by the exterior mirror radar beam 90 when the front side door 14 is closed, may be performed instead by the inward radar beam 84 when the front side door 14 is in fully-opened position. For example, and as shown in FIG. 21, the inward radar beam 84 may be used to detect a cyclist 8 approaching the vehicle 10 from the side and from behind. In another example, the inward radar beam 84 may be used to sense an object, such as a person, outside the vehicle 10 and adjacent the rear side door 16, which may be used to generate a warning and/or to prevent the rear side door 16 from being opened and striking such an object.

Figure 22:
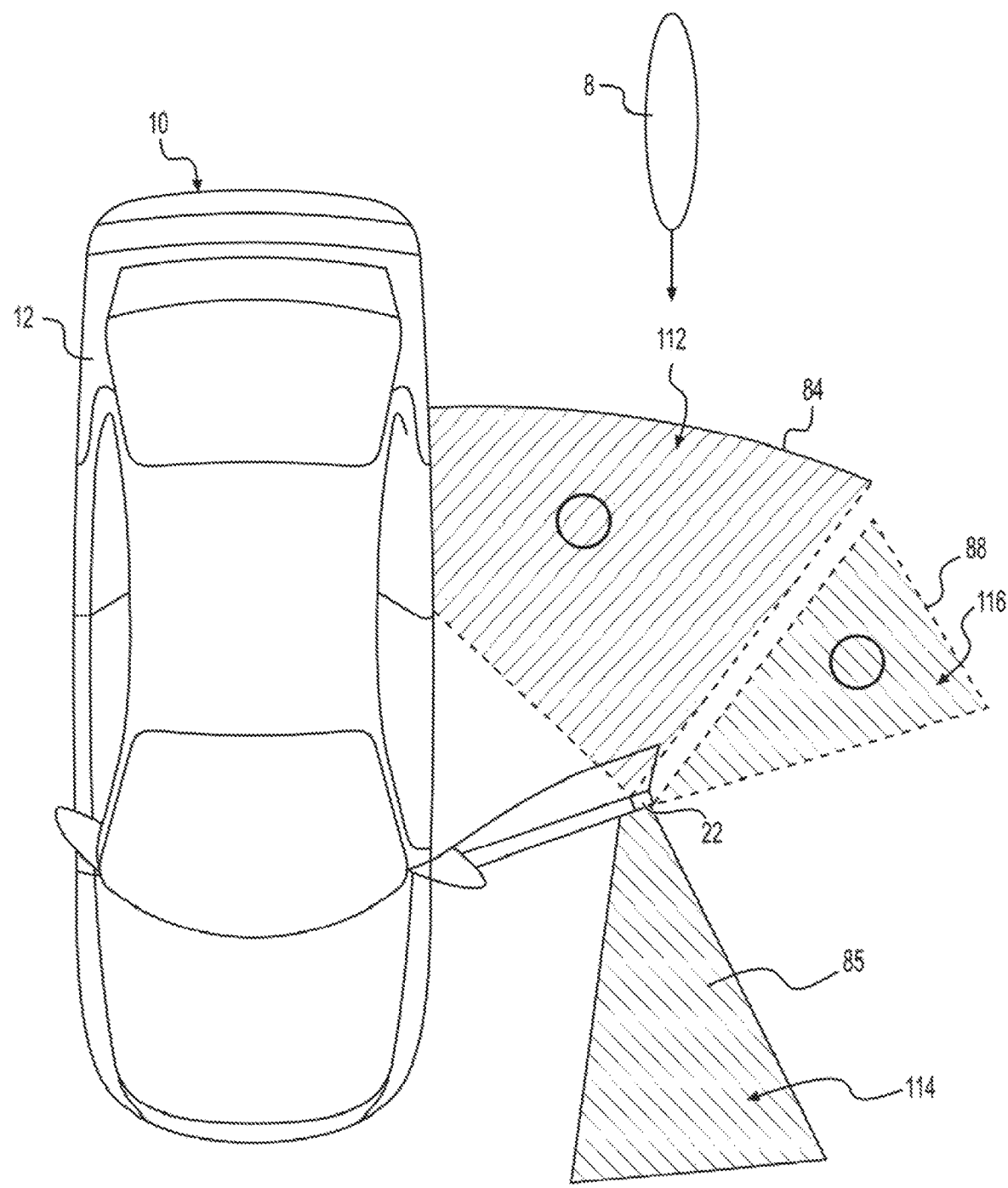
FIG. 22 is a top view of a motor vehicle with a front side door in a full opened position according to aspects of the disclosure.

FIG. 22 shows an overhead view of a vehicle 10 in accordance with some embodiments. Specifically, FIG. 22 shows the vehicle 10 with the front side door 14 in a fully-opened position, with the inward radar beam 84, and the outward radar beam 85, and the shut-face radar beam 88 each being active to detect objects within respective sensing zones 112, 114, 116. In some embodiments, and as shown in FIG. 22, the e-latch 22 may activate and/or monitor both the inward radar beam 84 and the shut-face radar beam 88 simultaneously, which may provide a greater range of coverage for non-contact object detection than either of the inward radar beam 84 or the shut-face radar beam 88, alone. In some embodiments, and as shown in FIG. 22, the e-latch 22 may activate and/or monitor at least one of the inward radar beam 84 and the shut-face radar beam 88 and the outward radar beam 85, which may provide a greater and dynamic range of coverage for non-contact object detection based on the position of the door 14, for example the closed position, the partially opened position, or the fully opened position, and/or on the operating mode of the door 14, for example the door 14 operating in an opening mode, or in a closing mode, or in a checked mode (stopped at an open position).

Figure 23:
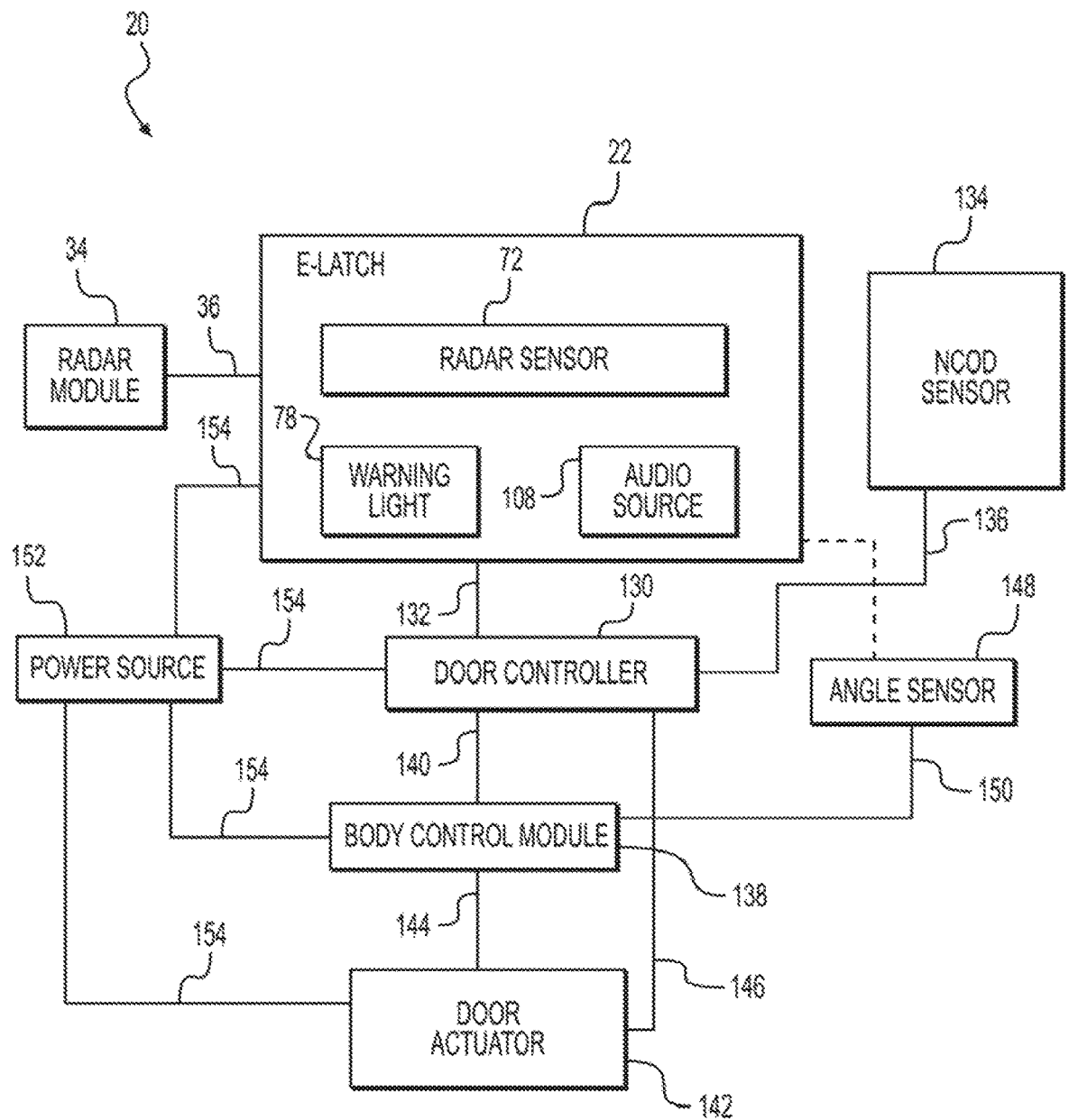
FIG. 23 is a block diagram of an electronic latch system for a motor vehicle according to aspects of the disclosure.

FIG. 23 shows a block diagram of the electronic latch system 20 in accordance with some embodiments. Specifically, the electronic latch system 20 includes the e-latch 22, which includes a radar sensor 72, and optionally a light source 78, and an audio source 108. The light source 78 may include a warning light, as shown for being directly observed by a person. Alternatively or additionally, light source 78 may be configured to project a light and/or an illuminated image upon a surface, such as the ground. A remotely-mounted radar module 34 is additionally or alternatively (to radar sensor 72) connected to the e-latch 22 via a signal cable 36. A door controller 130 is in communication with the e-latch 22 via a first data line 132. The door controller 130 may coordinate activities and devices related to an associated door 14, 16 within the vehicle 10, such as user control switches, latching, power window control, power door actuation, and/or positioning control of an exterior rear view mirror attached to the door 14, 16. One or more non-contact object detection sensors 134 may communicate with the door controller 130 via a third data line 136 extending therebetween. The non-contact object detection sensors 134 may include, for example, radar or infra-red (IR) sensors mounted within an exterior mirror housing 50 and/or on a pillar of the door 14, 16.

A body control module 138 may communicate with the door controller 130 via a third data line 140. The body control module 138 may coordinate actives in various locations throughout the body 12 of the vehicle 10, including sensors and/or actuators outside of the doors 14, 16. The body control module 138 may communicate directly with e-latch 22, for example with controller 170, via a separate data line (not shown). A door actuator 142 may be used to drive one or more the doors 14, 16 between the opened and the closed positions. The door actuator 142 may receive command instructions and/or provide status data to the body control module 138 via a fourth data line 144. Alternatively or additionally, the door actuator 142 may receive command instructions and/or provide status data directly to the door controller 130 via a fifth data line 146.

Still referring to FIG. 23, an angle sensor 148 measures an angle between the door 14, 16 and the body of the body 12 of the vehicle 10 and communicates the measured angle to the body control module 138 via a sixth data line 150. The angle sensor 148 may, therefore, be used to determine whether the door 14, 16 is in a closed position, a partially opened position, or a fully-opened position. In some embodiments, the angle sensor 148 may communicate the measured angle directly to the e-latch 22, as indicated by the dashed line. In some embodiments, the angle sensor 148 may be fixed to the body 12 of the vehicle 10. Alternatively, the angle sensor 148 may be fixed to the door 14, 16. In some embodiments, the angle sensor 148 may be fixed to the hinges between the body 12 and the door 14. In some embodiments, the angle sensor 148 may be fixed to the door actuator 142, for example to measure the extended or retracted position of an extensible member of the door actuator 142. In some embodiments, the angle sensor 148 may be fixed to the motor of the door actuator 142, for example to measure the rotations of the motor shaft of the door actuator 142. In some embodiments, the angle sensor 148 may be implemented as a software module provided in door controller 130 or Body Controller Module 138 for counting motor rotations of door actuator 142 causing back-EMF detected on signal line 144 and processed using ripple counting techniques for example. In some embodiments, the angle sensor 148 may be a hall sensor or switch provided in latch 22 to detect a position of the ratchet 25. In some embodiments, the angle sensor 148 may be a combination of such door position sensing configurations, and generally for determining the position of the door 14. As also shown in FIG. 23, the electronic latch system 20 may include a power source 152, such as a battery and/or an alternator, which may provide electrical power to the e-latch 22, the door controller 130, the body control module 138, and/or the door actuator 142, via power cables 154. Power source 152 may also provide power directly to remotely-mounted radar module 34.

Figure 24:
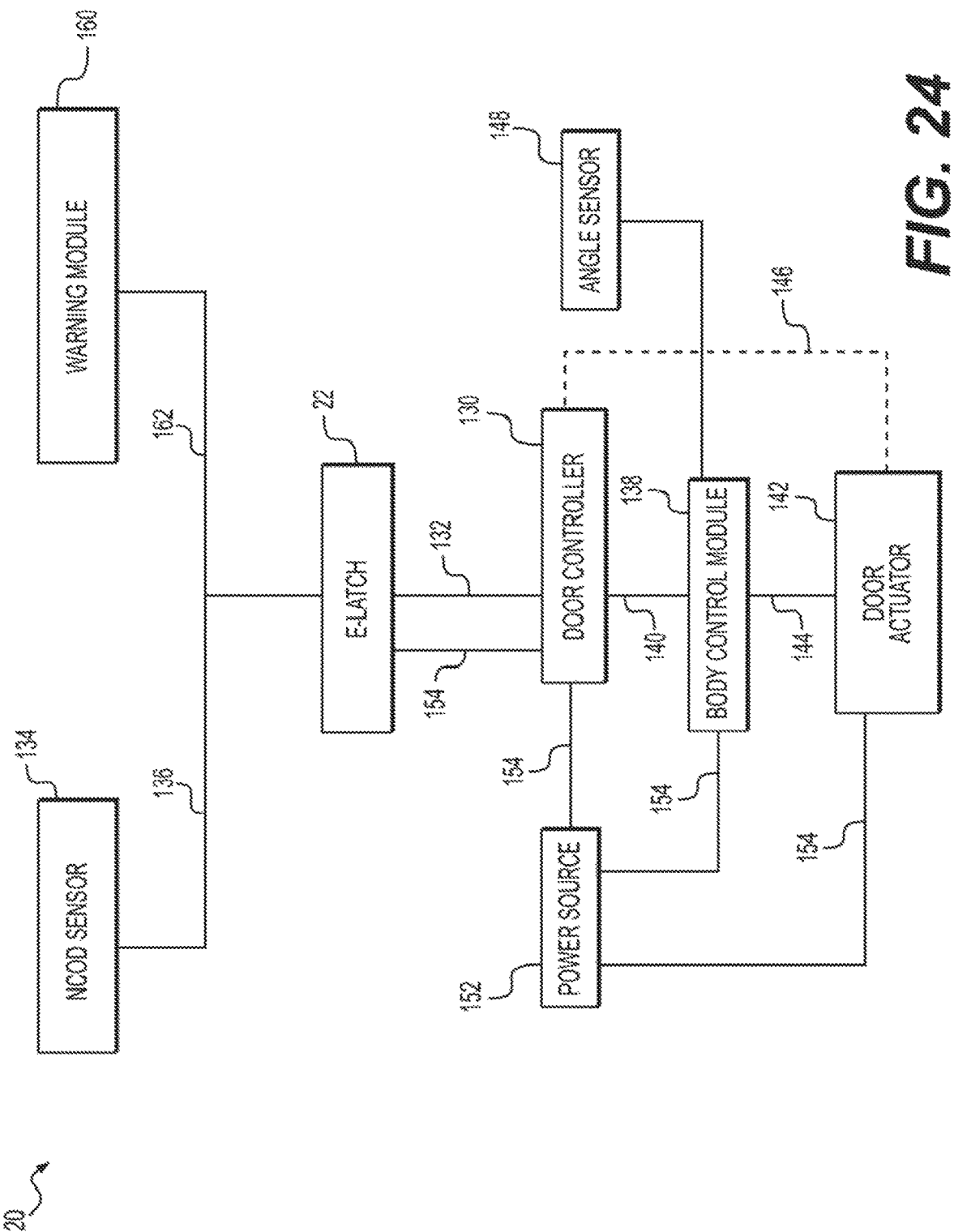
FIG. 24 is a block diagram of an electronic latch system for a motor vehicle according to aspects of the disclosure.

FIG. 24 shows a block diagram of the electronic latch system 20 in accordance with some embodiments. The e-latch system 20 shown in FIG. 24 is similar to the configuration shown in FIG. 23, with a few notable exceptions. In some embodiments, and as shown in FIG. 24, the power cable 154 feeding power to e-latch 22 may be connected to the door controller 130, which may provide for simpler wiring and/or connections by combining the power cable 154 with the first data line 132. A remote warning module 160, which may include one or both of a light source 78, and/or an audio source 108 may be mounted separate from the e-latch 22, and connected to the e-latch 22 by a seventh data line 162. The remote warning module 160 may be used in addition to or instead of a light source 78, and/or an audio source 108 disposed within the e-latch 22. The seventh data line 162 may be combined with one or more signal cables 136, which may be configured as a shared signal bus.

Figure 25:
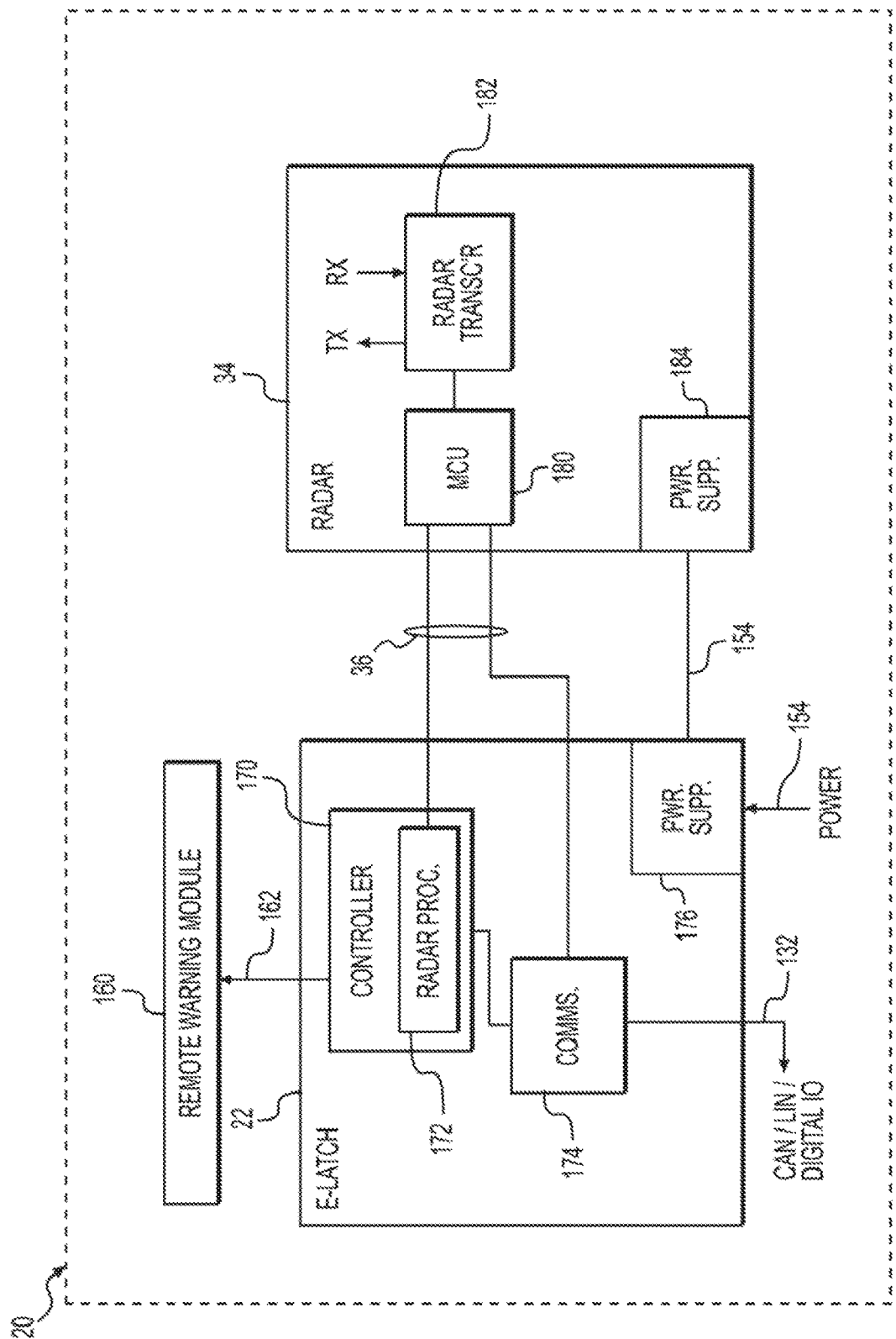
FIG. 25 is a block diagram of an electronic latch and a radar module according to aspects of the disclosure.

FIG. 25 shows a block diagram of an electronic latch 22 and a radar module 34 within the electronic latch system 20 in accordance with some embodiments. Specifically, the e-latch 22 includes an e-latch controller 170 which may be a microprocessor, a microcontroller, or an application specific integrated circuit. A radar processor module 172, is located within the e-latch controller 170 for processing signals from the radar module 34, for example raw radar signals. The processor module 172 may include hardware, software, or a combination of hardware and software. The e-latch 22 also includes a communications module 174 for enabling the e-latch controller 170 to communicate with external devices, such as the door controller 130 via the first data line 132, which may operate using digital I/O or a communications protocol such as Ethernet, Controller Area network (CAN), Local Interconnect Network (LIN), or other communication technique. Additionally or alternatively, the communications module 174 may facilitate communications between the e-latch controller 170 and the radar module 34.

FIG. 25 also shows some details of the radar module 34 in accordance with some embodiments. Specifically, FIG. 25 shows a radar controller 180, which may be a microcontroller unit (MCU). The radar controller 180 may include one or more microprocessors, application-specific integrated circuits (ASICs), hardware, and/or software. The radar controller 180 is in communication with a radar transceiver 182, which is configured to transmit radar waves, as indicated by the arrow labeled TX, and to receive radar waves, as indicated by the arrow labeled RX.

In some embodiments, the radar controller 180 may process data, for example raw data, from the radar transceiver 182 to determine if the received radar waves indicate the presence of an object. In some other embodiments, the e-latch controller 170 process the data, for example the raw data, from the radar transceiver 182 to determine whether the signals received by the from the radar transceiver 182 indicate the presence of an object, and/or additional data regarding a detected object, such as position, size, direction and speed of movement, etc. Examples of processing by either the controller 170 and/or the radar controller 180 may include without limitations applying one or more fast Fourier transforms (FFTs) to the radar data, performing filtering to the radar data, applying artificial intelligence analysis to the radar data, extracting signal features from the radar data, and/or other signal processing such as processing I and Q data, with its Amplitude and Phase, by itself to provide distinct, differentiable signals for a variety of motions of the object, applying filters and thresholds that can be applied to the raw radar data to obtain more precise information. (i.e. Micro-Doppler—overlapping FFTs, combining frequency and amplitude data to extract distinct shapes for motions; Frequency Shift Keying—Shifting frequency and using Phase information to determine range; Machine Learning—learning and storing Amplitude signals to make predictions on type of motion.), and other processing.

For example, the radar controller 180 may perform some pre-processing upon data from the radar transceiver 182, which may require limited resources, allowing the radar controller 180 to be a relatively simple device having a low cost and/or low power demand. The e-latch controller 170 may be a relatively high-powered device, performing the bulk of the computational load for recognizing objects in signals, for example raw or unprocessed radar data, received from one or more different radar modules 34. In this way, cost and complexity can be concentrated in the e-latch 22, and allowing the radar modules 34 to be relatively inexpensive and/or to have relatively low power consumption requirements.

In some embodiments, the e-latch 22 includes a first power supply module 176, configured to provide regulated electrical power to the various components such as the e-latch controller 170 and/or the communications module 174 from the power source 152 as delivered via the power cable 154. As also shown in FIG. 25, the radar module 34 may include a second power supply module 184 which may receive electrical power from the first power supply module 176 of the e-latch via a power cable 154. Second power supply module 184 may be a less complex and lower component count power regulating device compared to first power supply module 176. In some embodiment, second power supply module 184 not be provided, with first power supply module 176 performing the necessary power conditioning and supply management for both the radar sensor 34 and the e-latch 22, for example for supplying power consumed by the controller 170 and the radar controller 180 and radar transceiver 182. In some embodiments, this power cable 154 extending between the e-latch 22 and the radar module 34 may be physically combined with the signal cable 36 to simplify cabling within the door 14, 16 of the vehicle 10.

Figure 26:
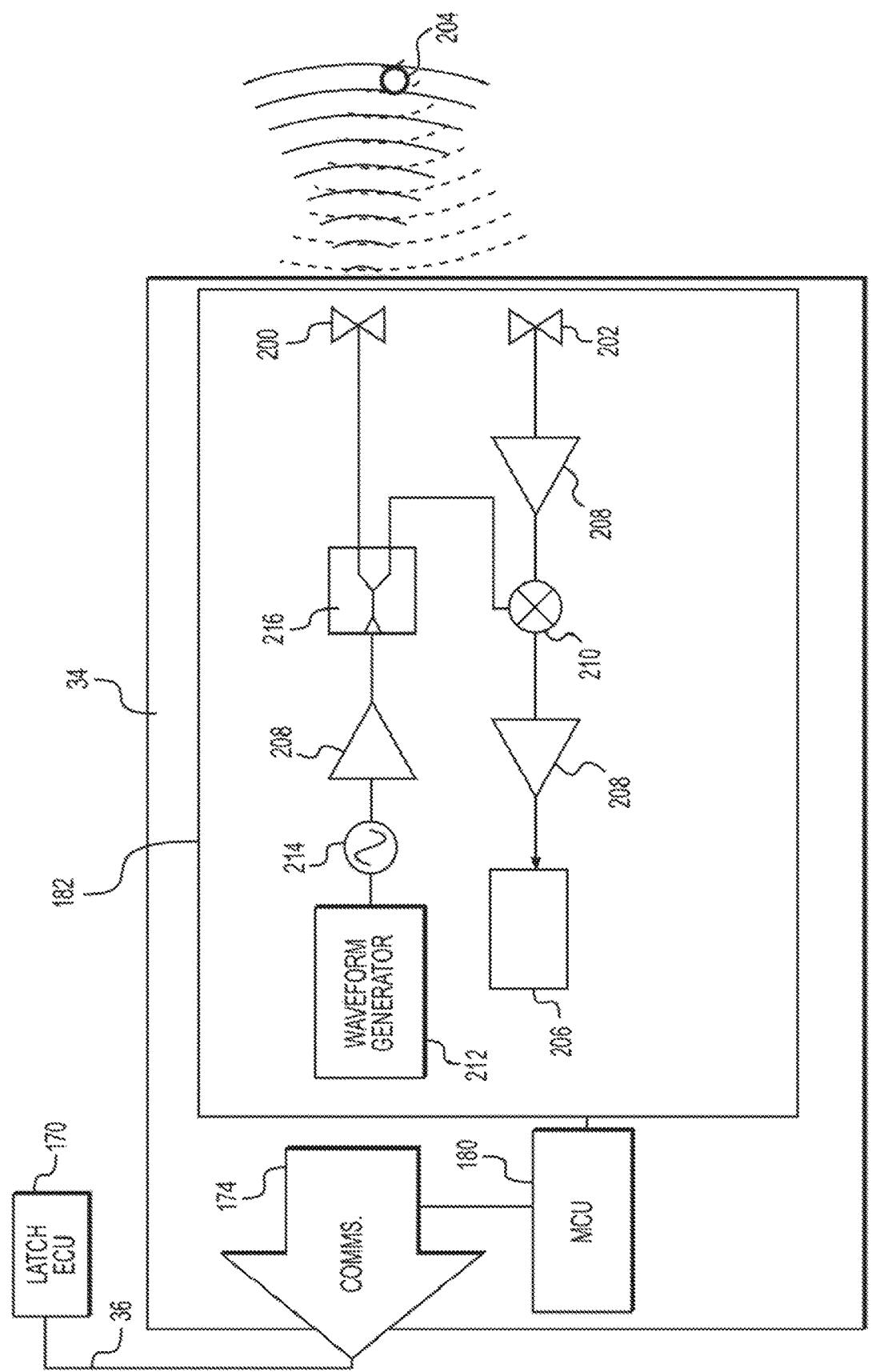
FIG. 26 is a block diagram illustrating a sensor assembly utilizing radar according to aspects of the disclosure.

FIG. 26 is a block diagram illustrating a sensor assembly utilizing radar according to aspects of the disclosure. Specifically, FIG. 26 illustrates components within a radar module 34. However, other radar sensors 72, such as those located within the e-latch 22 may have a similar construction. In some embodiments, the radar module 34 can be configured to emit continuously modulated radiation, ultra-wideband radiation, or sub-millimeter-frequency radiation (e.g., frequencies forming part of the ISM frequency band about 24 GHz, or the 60 GHz, or the 80 Hz frequency band as examples, but other ranges are also contemplated). For example, the radar module 34 may be configured to emit continuously emitted radiation by a radar emitting element 200, such as an antenna, or continuous wave (CW) radar, known in the art to use Doppler radar techniques, which can be employed in the radar based sensor as illustrated in FIG. 24.

As shown in FIG. 26, the radar module 34 includes a radar transceiver 182 configured to transmit and receive radar waves. The radar transceiver 182 includes a radar emitting element 200 configured to emit a modulated radio frequency (RF) radiation. Radar emitting element 200 may include multiple radar emitting elements 200, such as radar patch antenna(s) provided on the printed circuit board of radar module 34. Continuous wave (CW) radar, also known in the art to use Doppler radar techniques, may also be employed in the radar transceiver 182 illustrated in FIG. 26. Also, the radar module 34 may be configured for pulsed time-of-flight radar. Frequency Modulated Continuous wave (FMCW) radar, may also be employed in the radar transceiver 182 illustrated in FIG. 26. The radar transceiver 182 includes one or more receive elements 202, such as antenna(s), for receiving the reflections of the transmitted radar waves, which reflect off of an object 204. The radar emitting element 200 may be integrated into the sensor printed circuit board 70, or integrated into a radar chip affixed to the sensor printed circuit board 70.

In some embodiments, the radar module 34 may be configured to emit and detect continuous wave (CW) radar with the radar sensor including one transmit antenna 200 and one receive antenna 202. With such a configuration, the radar module 34 is operable to detect a speed/velocity of the object 204 using the Doppler Radar principles (i.e. processing by the e-latch controller 170 or a dedicated local application specific radar signal processor 180 of the received reflected CW radar signal to determine frequency shifts of an emitted continuous radiation wave indicative of the speed of the object 204). The radar emitting element 200 can be also configured to emit frequency modulated continuous wave (FMCW) radar. With such a configuration, the radar sensor is operable to detect motion characteristics of the obstacle 204 using Frequency Modulated Radar techniques, such as its speed or velocity, its distance, its angle relative to the radar transceiver 182, and its size, as examples.

The radar transceiver 182 also includes a signal processor 206 disposed in communication with the antenna element(s) 202 through signal processing elements such as high/low gain signal amplifiers 208, a mixer 210 configured to mix the received signal with a transmitted signal generated by a waveform generator 212 and modified by an oscillator 214 and received from a splitter 216 for processing the received reflections (i.e. the signal processor 206 or the radar controller 180 can be configured execute instructions stored in a memory to perform calculations on the received reflection and transmitted radiation signals (i.e. mixed signals) to implement the various detection techniques or algorithms, for example CW Radar, FMCW Radar, time of flight algorithms within the intermediate radar field, for example the sensing zones described herein, to provide data for determining the motion, speed, distance, positions and direction of the object. For example, the signal processor 206 or the radar controller 180 can be configured to process the received reflection, or the raw and unprocessed received radar signal, to determine a Doppler shift for calculating the speed/velocity of the object 204, or a frequency shift for calculating the distance and speed of the object 204.

Figure 27:
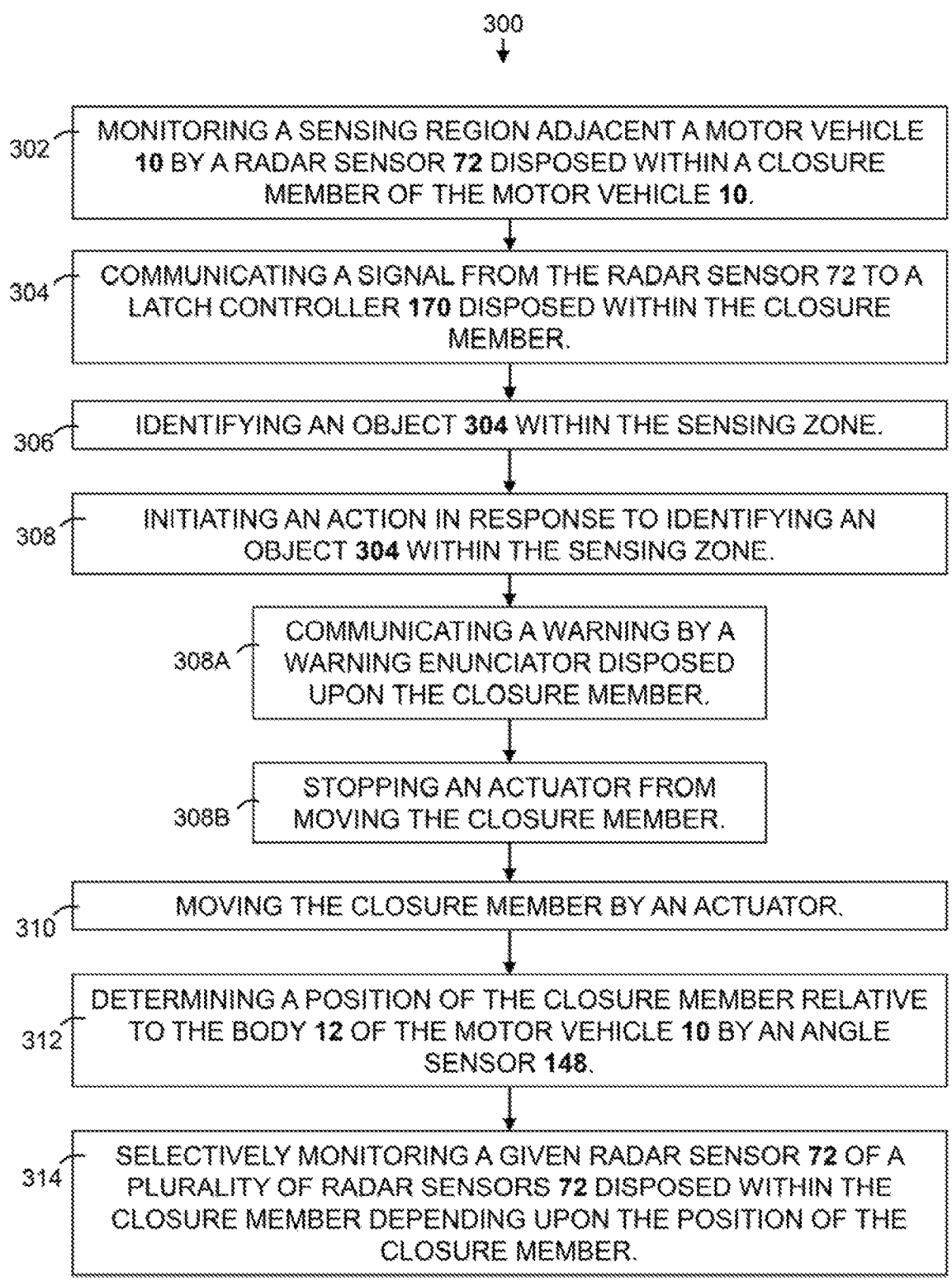
FIG. 27 is a flow chart illustrating steps in a method of operating an electronic latch system.

As illustrated in FIG. 27, a method 300 of operating an electronic latch system 20 is disclosed. The method 300 includes the step of 302 monitoring a sensing zone 112, 113, 114, 116 adjacent a motor vehicle 10 by a radar sensor 72 disposed within a closure member of the motor vehicle 10. In some embodiments, the closure member may be a side front door 14 or a side rear door 16 configured to open by pivoting relative to a body 12 of the vehicle 10. In other embodiments, the closure member may be a sliding door or panel, or a tailgate or lift gate.

The method 300 also includes the step of 304 communicating a signal from the radar sensor 72 to a latch controller 170 disposed within the closure member. The signal may be a simple on/off flag, such as a high or low voltage signal transmitted over a communication line between the radar sensor 72 and the latch controller 170 or may be encapsulated in a communication packet as part of a communication protocol, indicating the presence of an object. Alternatively, the signal may include complex data received by the radar sensor 72 to be processed by the latch controller 170 to determine the presence and/or characteristics of any detected objects. In some embodiments, the step of 304 communicating a signal from the radar sensor 72 to a latch controller 170 is performed using a direct communication path between the radar sensor 72 and the latch controller 170 and without being communicated via an intermediate controller. For example, the direct communications path may require routing the signal directly from the radar sensor 72 to the latch controller 170 and not through an intermediary controller such as a door controller 130 or a controller within the vehicle body 12, such as a body control module 138. In other words, the e-latch controller 22 may serve as a central monitoring point for all of the radar sensors 72 within the door 14, 16.

The method 300 may also include the step of 306 identifying an object 304 within the sensing zone. Step 306 may include transmitting and receiving signals to and from the radar sensor 72 within the sensing zone and processing data regarding signals received by the radar sensor 72 to determine the presence of an object 204, and/or characteristics of the object 204, such as size, position, angle, and velocity.

In some embodiments, the step of 306 identifying an object 204 within the sensing zone may include the sub-step of 306A processing raw data from the radar sensor 72 by a radar processor 172 within the latch controller 170. In other words, the primary computation in identifying the object 204 is performed within the latch controller 170 and not in a remote radar controller 180.

In some embodiments, the step of 306 identifying an object 204 within the sensing zone may include the sub-step of 306B processing a raw signal from a radar transceiver 182 by radar controller 180 to determine whether an object 204 is present within the sensing zone. In this case, the radar controller 180 may transmit a data flag, such as a Boolean data element indicating the presence or absence of the object 204 within the sensing zone. In some embodiments, the radar controller 180 may transmit additional information regarding a detected object 204, such as size, position, velocity, etc.

The method 300 may also include the step of 308 initiating an action in response to identifying an object 304 within the sensing zone.

In some embodiments, the step of 308 initiating an action in response to identifying an object 204 within the sensing zone may include the sub-step of 308*a* communicating a warning by a warning enunciator disposed upon the closure member. The warning enunciator may comprise a light source 78 and/or an audio source 108, such as a speaker or a buzzer. For example, a warning light beam 80 and/or audio signal 110 may be generated in response to detecting an object 204 that is a person or a vehicle, and which is potentially subjected to a dangerous condition, such as a door of the vehicle 10 being opened into the path of the object 204.

The method 300 may also include the step of 310 moving the closure member by an actuator. For example, where the closure is a vehicle side door 14, 16, a door actuator 142 may be configured to move the door 14, 18 between opened and closed positions, and vice-versa. An example of a door actuator is illustrated in commonly owned U.S. Pat. No. 9,174,517 entitled "Power Swing Door Actuator", the entire contents of which are incorporated herein by reference.

In some embodiments, the step of 308 initiating an action in response to identifying an object 204 within the sensing zone may include the sub-step of 308*b* stopping an actuator from moving the closure member. For example, the door actuator 142 can be stopped or paused or reversed in response to detecting an object 204 in the path of the door to prevent the door 14, 16 from colliding with the object 204.

The method 300 may also include the step of 312 determining a position of the closure member relative to the body 12 of the motor vehicle 10 by an angle sensor 148. The position of the closure member may be one of several different angular ranges including and extending between a fully-closed position and a fully-opened position. Angle sensor 148 may be a hardware component configured to detect the relative position between two parts, such as between an extensible member and a housing of the door actuator 142, or may be a software component executed by controller 170, or other local door actuator electronic control unit, for example ripple counting software executed by a local door actuator controller as illustrated for example in commonly owned US Patent Application No. US2018/0347252 entitled "Integrated controller with sensors for electromechanical biasing member", the entire contents of which are incorporated herein by reference.

The method 300 may also include the step of 314 selectively monitoring a given radar sensor 72 of a plurality of radar sensors 72 all disposed within the closure member depending upon the position of the closure member. For example, the closure member may be a door, such as a front side door 14, including a shut face door panel 44 defining a shut face, and the plurality of radar sensors 72 may include a shut-face sensor 72 configured to project a radar beam 88 through a port 86 in the shut face of the door 14. In such a configuration, the step of 314 selectively monitoring a given radar sensor 72 may include enabling and/or monitoring the shut-face sensor 72 when the front side door 14 is open to a first partially-open position, such as the position shown in FIG. 19, where the shut face port 86 is uncovered, allowing a shut-face radar beam 88 to extend outwardly from the shut-face port 86.

In another example case, the closure member may be a door, such as a front side door 14, including an inside door panel 40 defining inner face, and the plurality of radar sensors 72 may include an inner-face sensor 72 configured to project an inward radar beam 84 through an inward-facing port 82 in the inner face of the door 14. In such a configuration, the step of 314 selectively monitoring a given radar sensor 72 may include enabling and/or monitoring the inner-face sensor 72 when the front side door 14 is positioned such that the inward-facing port 82 is uncovered, allowing an inward radar beam 84 to extend outwardly from the inward-facing port 82. Examples of such a position include the second partially-opened position shown in FIG. 20 or the fully-opened position shown in FIG. 21.

Figures 28, 29:
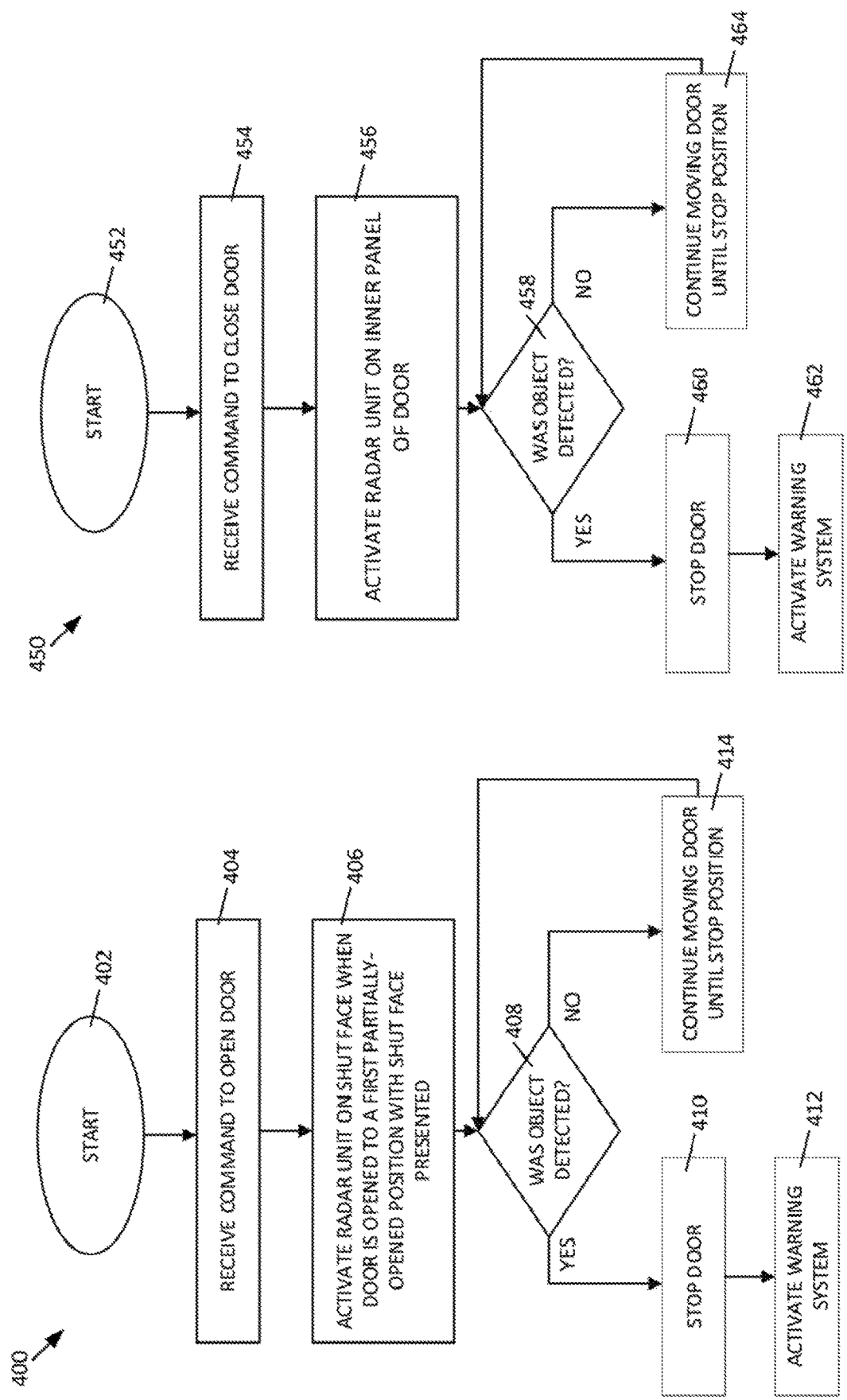
FIG. 28 is a flow chart illustrating steps for opening a closure member in accordance with aspects of the disclosure.
FIG. 29 is a flow chart illustrating steps for closing a closure member in accordance with aspects of the disclosure.

FIG. 28 shows steps in a method 400 for opening a closure, such as a door 14, 16 of a vehicle 10. The method 400 starts at block 402 and includes receiving a command to open the door at step 404. The command may be received directly from a user and/or from a controller within the vehicle 10.

The method 400 proceeds by activating a radar unit on the shut face of the door when the door is opened to a first partially-opened position with the shut face exposed or presented at step 406. Radar unit on the shut face may be activated prior to the door opening to a first partially-opened position and configured to ignore or reject any received reflected radar signals. This step 406 is described in more detail above with reference to FIGS. 20-21.

The method 400 proceeds by deciding if an object was detected in the path of the opening door at step 408. If yes, then the method 400 proceeds with stopping the door at step 410 and optionally activating a warning system, such as a warning light and/or sound at step 412. If no, then the method 400 proceeds with continuing to move the door until it reaches the stop position at step 414. The stop position may be, for example, a fully-opened position.

FIG. 29 shows steps in a method 450 for closing a closure, such as a door 14,16 of a vehicle 10. The method 450 starts at block 452 and includes receiving a command to close the door at step 454. The command may be received directly from a user and/or from a controller within the vehicle 10.

The method 450 proceeds by activating a radar unit on the inner panel the door at step 456. This step 456 is described in more detail above with reference to FIGS. 20-21.

The method 450 proceeds by deciding if an object was detected in the path of the closing door at step 458. If yes, then the method 450 proceeds with stopping the door at step 460 and optionally activating a warning system, such as a warning light and/or sound at step 462. If no, then the method 450 proceeds with continuing to move the door until it reaches the stop position at step 464. The stop position may be, for example, a fully-closed position.

Figure 30:
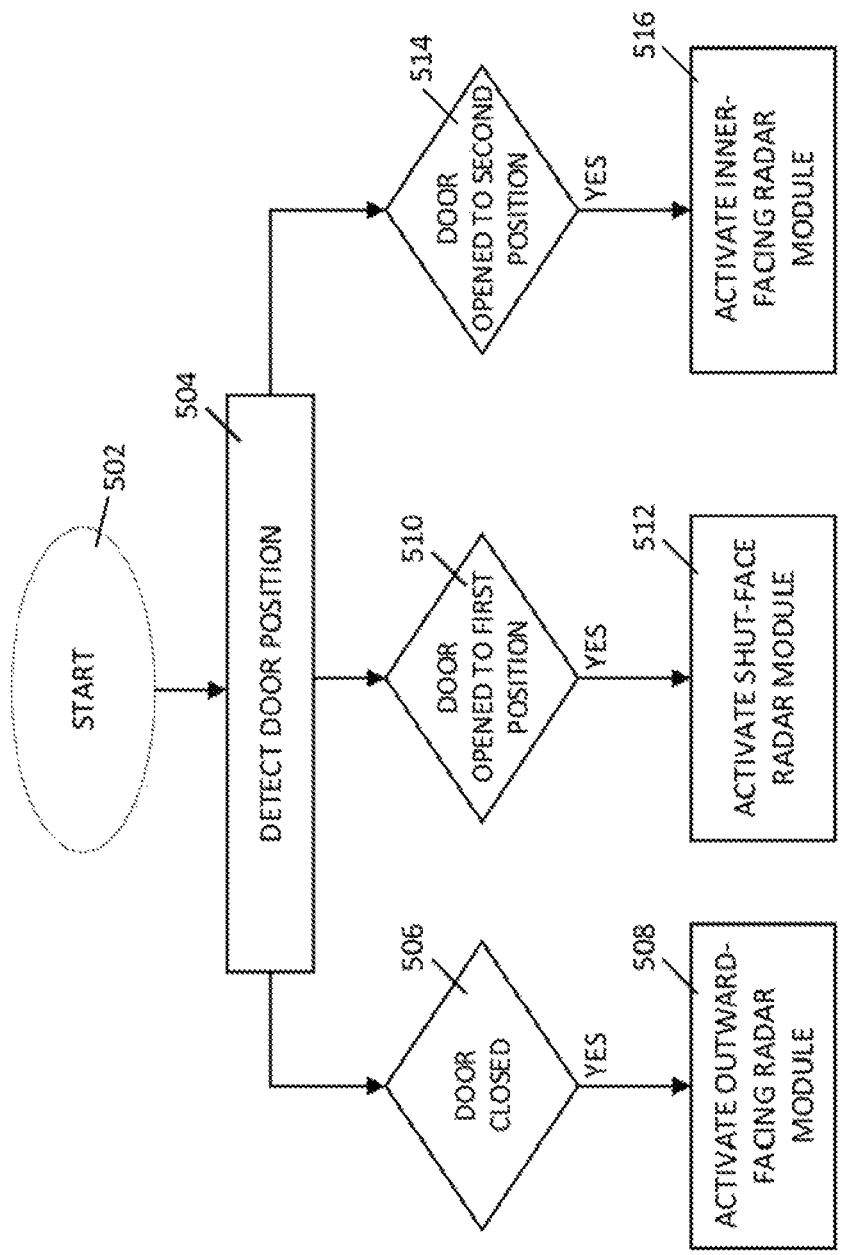
FIG. 30 is a flow chart illustrating steps for non-contact object detection in accordance with aspects of the disclosure.

FIG. 30 shows steps in a method 500 for activating various non-contact object detection sensors, such as radar sensors based on a position of a closure member, such as a door 14, 16 of a vehicle 10. The method 500 starts at block 502 and includes detecting a position of the door 14, 16 at step 504. The position of the door 14, 16 may be detected by a door angle sensor 148, particularly where the door 14, 16 is pivotably attached to the body 12 of the vehicle 10.

The method 500 includes determining if the door is closed at step 506, and if yes, activating an outward-facing radar module at step 508, for detecting objects for lane departure and/or blind spot detection operating modes of the vehicle 10, for example. An example of these steps 506, 508 is described above with reference to FIG. 18.

The method 500 includes determining if the door is open to a first partially-opened position at step 510, and if yes, activating a shut-face radar module at step 512, for detecting objects for non-contact obstacle detection for front door and rear door operation, for providing obstacle detection for warning systems alerting objects approaching the door and/or the vehicle rearward the shut face. Shut-face radar module provides a dynamic sensing zone which changes along with the pivoting of the door, and maintains detecting coverage of a sensing zone as the door pivots. An example of these steps 510, 512 is described above with reference to FIG. 19.

The method 500 includes determining if the door is open to a second partially-opened position at step 514, and if yes, activating an inner-facing radar module at step 516, for detecting objects for non-contact obstacle detection for rear door opening operation and for front door closing operation for example, and for providing obstacle detection for warning systems alerting objects approaching the door and/or the vehicle rearward the inner panel. An example of these steps 514, 516 is described above with reference to FIGS. 20-21.

A proximity detection system referred to in an illustrative embodiment as an electronic latch system 20 for a motor vehicle 10 is therefore disclosed and includes at least one proximity sensor such as a radar sensor provided at a distal end of a vehicle door 14, opposite the proximate end of vehicle door 14 mounted thereto hinges 17. As a result, a proximity detection system is provided that includes sensing areas that changes in response to the movement of the door 14, and which includes at least one proximity sensor which can be controlled, such as activated and monitored, during such movement of the door 14 and based on the position of the door 14 for minimizing blind spot obstacle detection zones about the vehicle 10. The electronic latch system 20 may illustratively include a latch controller 170 in direct communication with the at least one proximity sensor, without an intermediate controller disposed between the communication path between the latch controller 170 and the at least one proximity sensor, such as for example the radar module 34. There is also provided a vehicle door including at least one non-contact object detection (NCOD) sensor fixed to the closure, such as door 14 adjacent the shut face of the door, and a controller 170 configured to selectively enable the at least one NCOD sensor in response to detecting the position of the closure. The controller 170 may be housed within latch 22.

Clearly, changes may be made to what is described and illustrated herein without, however, departing from the scope defined in the accompanying claims. The non-contact obstacle detection system may operate with myriad combinations of various types of non-contact sensors and for any closure members of the motor vehicle, for example. In general, the non-contact obstacle detection system may be used also for other purposes, within the motor vehicle, or for different automotive applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 30 degrees or at other orientations) and the spatially relative descriptions used herein interpreted accordingly.

What is claimed is:

1. An electronic latch for a closure member of a motor vehicle comprising:
   a latch housing configured to be attached to the closure member;
   a latching mechanism disposed within the latch housing and configured to hold the closure member in a closed position;
   a latch actuator configured to drive the latching mechanism between a locked condition and an unlocked condition;
   a latch controller configured to provide a drive signal to the latch actuator to cause the latching mechanism to drive the latch actuator into one of the locked condition or the unlocked condition in response to a command signal; and
   a plurality of radar sensors in communication with the latch controller and each including at least one radar antenna configured to detect an object in a sensing zone,
   wherein the latch controller is configured to determine a position of the closure member relative to a body of the motor vehicle and selectively monitor a given one of the plurality of radar sensors depending upon the position of the closure member.

2. The electronic latch of claim 1, wherein the at least one radar antenna of at least one of the radar sensors is disposed within the latch housing.

3. The electronic latch of claim 1, wherein at least one radar sensor of the plurality of radar sensors is disposed within the closure member and remotely from the latch housing.

4. The electronic latch of claim 1, further comprising a light source in communication with the latch controller and disposed upon the closure member and configured to illuminate a warning in response to an object being detected in the sensing zone.

5. A method of operating an electronic latch system, comprising:
   monitoring a sensing zone adjacent a motor vehicle by a radar sensor disposed within a closure member of the motor vehicle, wherein the radar sensor is one of a plurality of radar sensors disposed within the closure member;
   communicating a signal from the radar sensor to the latch controller disposed within the closure member, wherein communicating the signal from the radar sensor to the latch controller is performed using a direct communication path between the radar sensor and the latch controller and without being communicated via an intermediate controller;
   determining a position of the closure member relative to a body of the motor vehicle;
   controlling the radar sensor using a latch controller disposed within the closure member; and
   selectively monitoring a given one of the plurality of radar sensors depending upon the position of the closure member.

6. The method of claim 5, further comprising:
   identifying an object within the sensing zone; and
   initiating an action in response to identifying an object within the sensing zone.

7. The method of claim 6, wherein initiating an action in response to identifying an object within the sensing zone further comprises:
   communicating a warning by a warning enunciator disposed upon the closure member; and
   wherein the warning enunciator comprises one of a light source or an audio source.

8. The method of claim 6, further comprising:
   transmitting a signal to move the closure member by an actuator; and
   wherein initiating an action in response to identifying an object within the sensing zone further comprises transmitting a signal to stop the actuator from moving the closure member.

9. The method of claim 6, wherein identifying an object within the sensing zone comprises one of:
   processing the signal from the radar sensor by a radar processor within the latch controller to determine the presence or absence of an object within the sensing zone; or
   processing a raw signal from a radar transceiver by a radar controller within the radar sensor to determine the presence or absence of an object within the sensing zone.

10. The method of claim 5:
    wherein the closure member is a door defining a shut face;
    wherein the plurality of radar sensors includes a shut-face sensor configured to project a radar beam through a port in the shut face of the door; and
    wherein selectively monitoring a given one of the plurality of radar sensors depending upon the position of the closure member comprises monitoring the shut-face sensor with the door in a first position with the shut-face sensor exposed.

11. The latch of claim 1, further comprising a direct communication path between at least one radar sensor of the plurality of radar sensors and the latch controller for communicating a signal from the at least one radar sensor to the latch controller.

12. The latch of claim 11, wherein the signal is communicated without being communicated via an intermediate controller.

13. The latch of claim 1, wherein the at least one radar antenna is configured to transmit waves and to receive reflected waves, and wherein the closure member includes sheet metal that is adapted to allow the transmitted waves and the reflected waves to pass therethrough.

\* \* \* \* \*